US012486905B2

(12) United States Patent
Hutchinson et al.

(10) Patent No.: US 12,486,905 B2
(45) Date of Patent: Dec. 2, 2025

(54) CRYOGENIC VALVES WITH MODULAR EXTENDED STEMS

(71) Applicant: Acme Cryogenics, Inc., Allentown, PA (US)

(72) Inventors: Daniel Richard Hutchinson, Bethlehem, PA (US); David Michael Rakos, Lehighton, PA (US)

(73) Assignee: Acme Cryogenics, Inc., Allentown, PA (US)

( * ) Notice: Subject to any disclaimer, the term of this patent is extended or adjusted under 35 U.S.C. 154(b) by 6 days.

(21) Appl. No.: 18/431,322

(22) Filed: Feb. 2, 2024

(65) Prior Publication Data
US 2024/0263708 A1    Aug. 8, 2024

Related U.S. Application Data

(60) Provisional application No. 63/482,931, filed on Feb. 2, 2023.

(51) Int. Cl.
*F16K 3/24* (2006.01)
*F16K 1/02* (2006.01)
(Continued)

(52) U.S. Cl.
CPC ............. *F16K 3/246* (2013.01); *F16K 1/02* (2013.01); *F16K 3/30* (2013.01); *F16K 27/02* (2013.01); *F16K 31/46* (2013.01); *F16K 31/60* (2013.01)

(58) Field of Classification Search
CPC ... F16K 3/246; F16K 1/02; F16K 3/30; F16K 27/02; F16K 31/46; F16K 31/60
(Continued)

(56) References Cited

U.S. PATENT DOCUMENTS 6,302,374 B1  10/2001  Fink
2022/0003324 A1*  1/2022  Hosokawa ............... F16K 1/38
2024/0142000 A1  5/2024  Cao

FOREIGN PATENT DOCUMENTS

CH   699775    4/2010
EP   2336613   4/2019
(Continued)

OTHER PUBLICATIONS

Rego Catalog, Gas Plant and Cryogenic Equipment, p. 9, 1986.
International Search Report and Written Opinion for PCT/US2024/014292 dated Jun. 19, 2024, 13 pp.

*Primary Examiner* — John Bastianelli
(74) *Attorney, Agent, or Firm* — Neal, Gerber & Eisenberg LLP

(57) ABSTRACT

Cryogenic valves with modular extended stems are disclosed. A modular stem assembly includes a stem including a first end and a second end. The modular stem assembly includes a first disk connector coupled to the first end of the stem. The first disk connector defines a slot configured to securely receive a stem head of a second stem assembly of the cryogenic valve. The first disk connector has a first outer radial surface to slidably engage an inner surface of a bonnet of the cryogenic valve. The modular stem assembly includes a second disk connector coupled to the second end of the stem. The second disk connector includes a head configured to be securely received by a stem slot of a third stem assembly of the cryogenic valve. The second disk connector has a second outer radial surface to slidably engage the inner surface of the bonnet.

20 Claims, 17 Drawing Sheets

(51) Int. Cl.
*F16K 3/30* (2006.01)
*F16K 27/02* (2006.01)
*F16K 31/46* (2006.01)
*F16K 31/60* (2006.01)

(58) Field of Classification Search
USPC .................................................. 251/291–293
See application file for complete search history.

(56) References Cited

FOREIGN PATENT DOCUMENTS

| WO | WO2022198439 | 9/2022 |
| WO | WO2022199057 | 9/2022 |

* cited by examiner

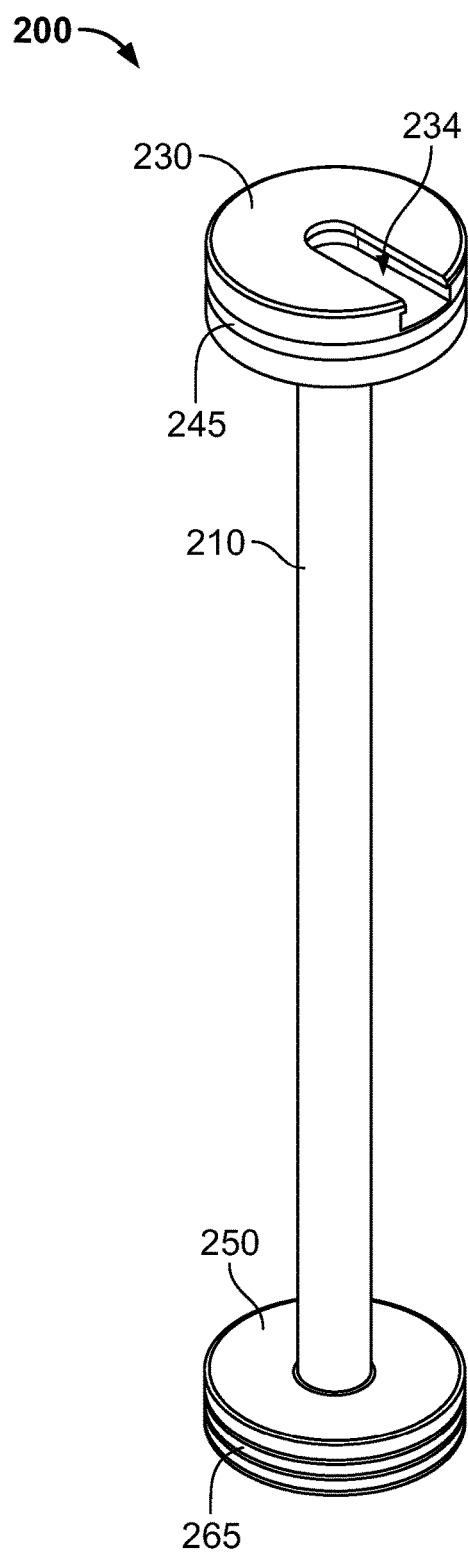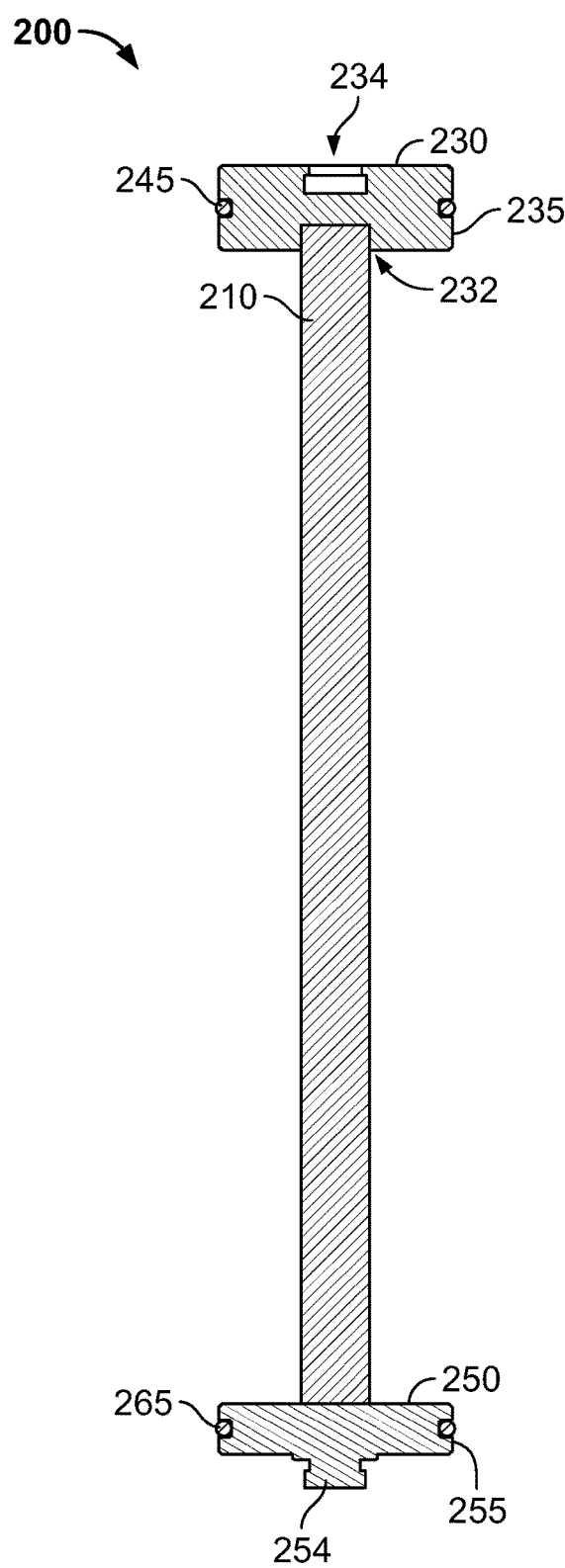
FIG. 13                                    FIG. 14

CRYOGENIC VALVES WITH MODULAR EXTENDED STEMS

CROSS-REFERENCE TO RELATED APPLICATIONS

This application claims priority to U.S. Provisional App. No. 63/482,931, which was filed on Feb. 2, 2023 and is incorporated by reference herein in its entirety.

TECHNICAL FIELD

This disclosure generally relates to cryogenic valves and, more particularly, to cryogenic valves with modular extended stems.

BACKGROUND

Cryogenic fluids are increasingly used in a variety of applications, including as fuel for machines such as vehicles. Cryogenic fluids are extremely cold and are required to be stored at cryogenic temperatures (e.g., temperatures less than −150 degrees Celsius), in for example, storage tanks. One or more valves may be used to control the transfer of the cryogenic fluid from the storage tank to another container for subsequent use.

In some instances, the storage tank for cryogenic fluid is stored well below ground for insulation purposes to maintain the cryogenic temperature of the fluid. In such instances, a valve used to control the flow of cryogenic fluid may need to extend a great length to reach a storage buried deep underground. Oftentimes, the cryogenic tank is buried so far underground that the corresponding valve is unable to use a single monolithic stem unit, for instance, due to difficulties with manufacturing and/or installation, undue stresses placed on the stem during operation, etc. As a result, some cryogenic valves incorporate a stacked stem assembly in which a stem piece connects to and is stacked on top of others to form the length of the stem for the cryogenic valve. However, in some instances, the stacked stem pieces may tilt and/or become misaligned overt time during operation of the cryogenic valve.

SUMMARY

An example cryogenic valve includes a valve body and a bonnet coupled to the valve body and including an inner bonnet surface. The cryogenic valve includes a plug, a handle, and a plurality of stem assemblies stacked axially between and operatively connecting the handle and the plug. The plurality of stem assemblies include an upper stem assembly operatively connected to the handle and including a first head, a lower stem assembly connected to the plug and including a first slot, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular slot for securely coupling to another of the plurality of stem assemblies. The upper disk connector has a first outer radial surface defined by an outer diameter to slidably engage the inner bonnet surface. Each of the one or more modular stem assemblies includes a lower disk connector coupled to the lower end of the stem. The lower disk connector includes a modular head for securely coupling to another of the plurality of stem assemblies. The lower disk connector has a second outer radial surface defined by the outer diameter to slidably engage the inner bonnet surface.

Another example cryogenic valve includes a valve body and a bonnet coupled to the valve body and including an inner bonnet surface. The cryogenic valve includes a plug, a handle, and a plurality of stem assemblies extending between and operatively connecting the handle and the plug. The plurality of stem assemblies include an upper stem assembly operatively connected to the handle and including a first slot, a lower stem assembly connected to the plug and including a first head, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular head for securely coupling to another of the plurality of stem assemblies. The upper disk connector has a first outer radial surface defined by an outer diameter to slidably engage the inner bonnet surface. Each of the one or more modular stem assemblies includes a lower disk connector coupled to the lower end of the stem. The lower disk connector includes a modular slot for securely coupling to another of the plurality of stem assemblies. The lower disk connector has a second outer radial surface defined by the outer diameter to slidably engage the inner bonnet surface.

An example modular stem assembly for a cryogenic valve is disclosed. The modular stem assembly includes a stem including a first end and a second end. The modular stem assembly includes a first disk connector coupled to the first end of the stem. The first disk connector defines a slot configured to securely receive a stem head of a second stem assembly of the cryogenic valve. The first disk connector has a first outer radial surface defined by an outer diameter to slidably engage an inner surface of a bonnet of the cryogenic valve. The modular stem assembly includes a second disk connector coupled to the second end of the stem. The second disk connector includes a head configured to be securely received by a stem slot of a third stem assembly of the cryogenic valve. The second disk connector has a second outer radial surface defined by the outer diameter to slidably engage the inner surface of the bonnet.

An example plurality of stem assemblies are stacked axially between and operatively connecting a handle and a plug of a cryogenic valve. The plurality of stem assemblies include an upper stem assembly operatively connected to the handle and including a first head, a lower stem assembly connected to the plug and including a first slot, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular slot for securely coupling to another of the plurality of stem assemblies. The upper disk connector has a first outer radial surface defined by an outer diameter. Each of the one or more modular stem assemblies includes a lower disk connector coupled to the lower end of the stem. The lower disk connector includes a modular head for securely coupling to another of the plurality of stem assemblies. The lower disk connector has a second outer radial surface defined by the outer diameter.

Another example plurality of stem assemblies are stacked axially between and operatively connecting a handle and a plug of a cryogenic valve. The plurality of stem assemblies include an upper stem assembly operatively connected to the handle and including a first slot, a lower stem assembly connected to the plug and including a first head, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular head for securely coupling to another of the plurality of stem assemblies. The upper disk connector has a first outer radial surface defined by an outer diameter. Each of the one or more modular stem assemblies includes a lower disk connector coupled to the lower end of the stem. The lower disk connector includes a modular slot for securely coupling to another of the plurality of stem assemblies. The lower disk connector has a second outer radial surface defined by the outer diameter.

Another example cryogenic valve includes a valve body, a bonnet coupled to the valve body and including an inner bonnet surface, a plug, a handle, and a plurality of stem assemblies stacked axially between and operatively connecting the handle and the plug. The plurality of stem assemblies include an upper stem assembly operatively connected to the handle and including a first downward-facing connector, a lower stem assembly connected to the plug and including a first upward-facing connector, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular upward-facing connector for securely coupling to another of the plurality of stem assemblies. The upper disk connector has a first outer radial surface defined by an outer diameter to slidably engage the inner bonnet surface. Each of the one or more modular stem assemblies includes a lower disk connector coupled to the lower end of the stem. The lower disk connector includes a modular downward-facing connector for securely coupling to another of the plurality of stem assemblies. The lower disk connector has a second outer radial surface defined by the outer diameter to slidably engage the inner bonnet surface.

Another example plurality of stem assemblies are stacked axially between and operatively connecting a handle and a plug of a cryogenic valve. The plurality of stem assemblies include an upper stem assembly operatively connected to the handle and including a first downward-facing connector, a lower stem assembly connected to the plug and including a first upward-facing connector, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular upward-facing connector for securely coupling to another of the plurality of stem assemblies. The upper disk connector has a first outer radial surface defined by an outer diameter. Each of the one or more modular stem assemblies includes a lower disk connector coupled to the lower end of the stem. The lower disk connector includes a modular downward-facing connector for securely coupling to another of the plurality of stem assemblies. The lower disk connector has a second outer radial surface defined by the outer diameter.

BRIEF DESCRIPTION OF THE DRAWINGS

FIG. 13 is a perspective view of an example modular stem assembly of the valve of FIG. 7 in accordance with the teachings herein.
FIG. 14 is a cross-sectional view of the modular stem assembly of FIG. 13.

DETAILED DESCRIPTION OF THE DRAWINGS

Figure 1:
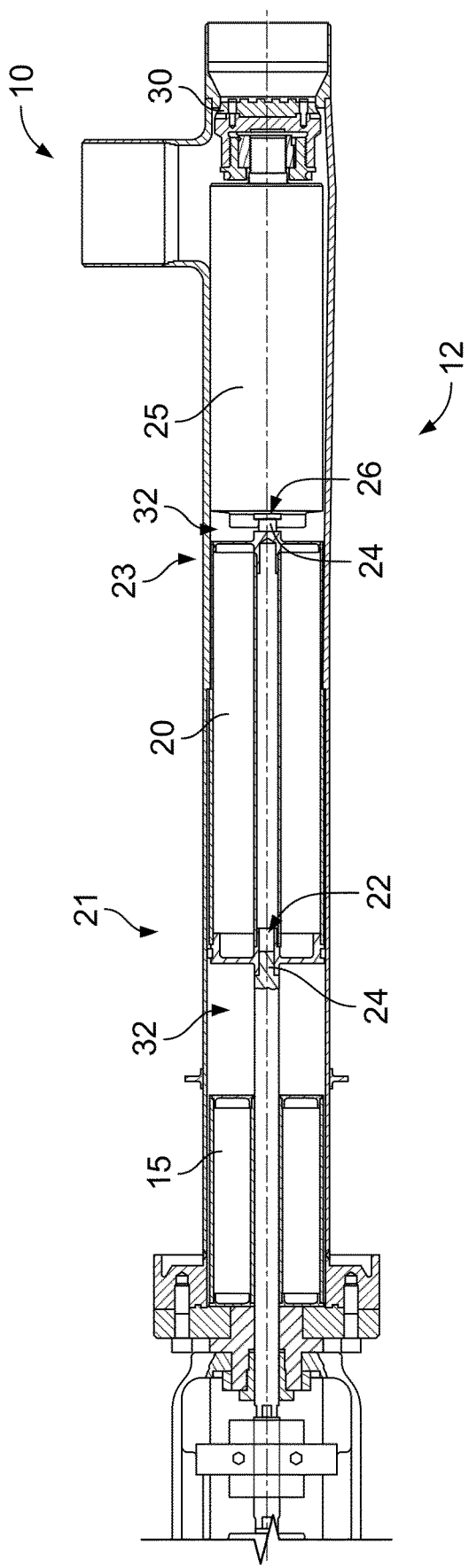
FIG. 1 depicts a prior globe valve.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The present specification is intended to be taken as a whole and interpreted in accordance with the principles of the present invention as taught herein and understood by one of ordinary skill in the art.

The scope of the present invention is intended to cover all such embodiments that may fall within the scope of the appended claims, either literally or under the doctrine of equivalents. The specification describes exemplary embodiments which are not intended to limit the claims or the claimed inventions. Features described in the specification, but not recited in the claims, are not intended to limit the claims.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Some features may be described using relative terms such as top, bottom, vertical, rightward, leftward, etc. It should be appreciated that such relative terms are only for reference with respect to the appended drawings. These relative terms are not meant to limit the disclosed embodiments.

Figure 2:
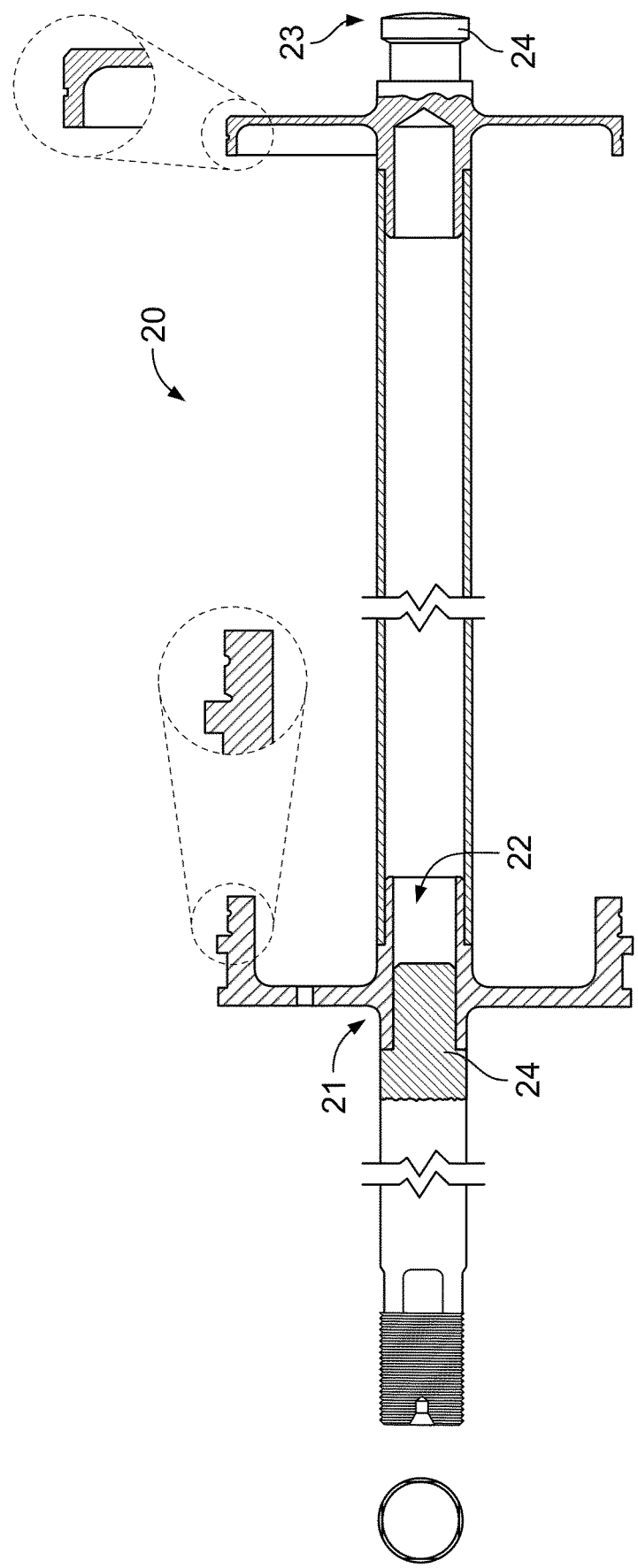
FIG. 2 depicts a stem of the prior globe valve of FIG. 1.

Turning to the figures, FIG. 1 depicts a previously-known design of globe valve 10. Globe valve 10 includes stem 12 formed by first stem segment 15, second stem segment 20, barrel segment 25. FIG. 2 further depicts second stem segment 20. First stem segment 15 is connected to second stem segment 20, second stem segment 20 is connected to barrel segment 25, and barrel segment 25 is connected plug 30. That is, second stem segment 20 extends between and is coupled to first stem segment 15 and barrel segment 25.

Second stem segment 20 includes first end 21 and opposing second end 23. First end 21 defines opening 22 that receives end 16 of first stem segment 15. Second end 23 includes head 24 that is received by end 26 of barrel segment 25. As most clearly shown in FIG. 2, first and second ends 21, 23 of second stem segment 20 are not modular. That is, opening 22 and head 24 are shaped differently such that head 24 of second stem segment 20 cannot be securely received by opening 22 of another second stem segment 20.

Thus, because the shape of second stem segment 20 prevents multiple second stem segments 20 from being stacked together, the length of stem 12 cannot be extended by adding additional stem segments to stem 12. Additionally, as most clearly shown in FIG. 1, gap 32 is formed between first end 21 of second stem segment 20 and end 16 of first stem segment 15, and gap 34 is formed between second end 23 of second stem segment 20 and end 26 of barrel segment 25. Gaps 32, 34 formed between the coupled together segments of stem 12 may result in misalignment or tilting of those segments relative to a longitudinal axis of globe valve 10, which may become exacerbated if additional segments were added to stem 12. Misalignment or tilting of the segments may result in unintended leaking of fluid around stem 12.

Figure 3:
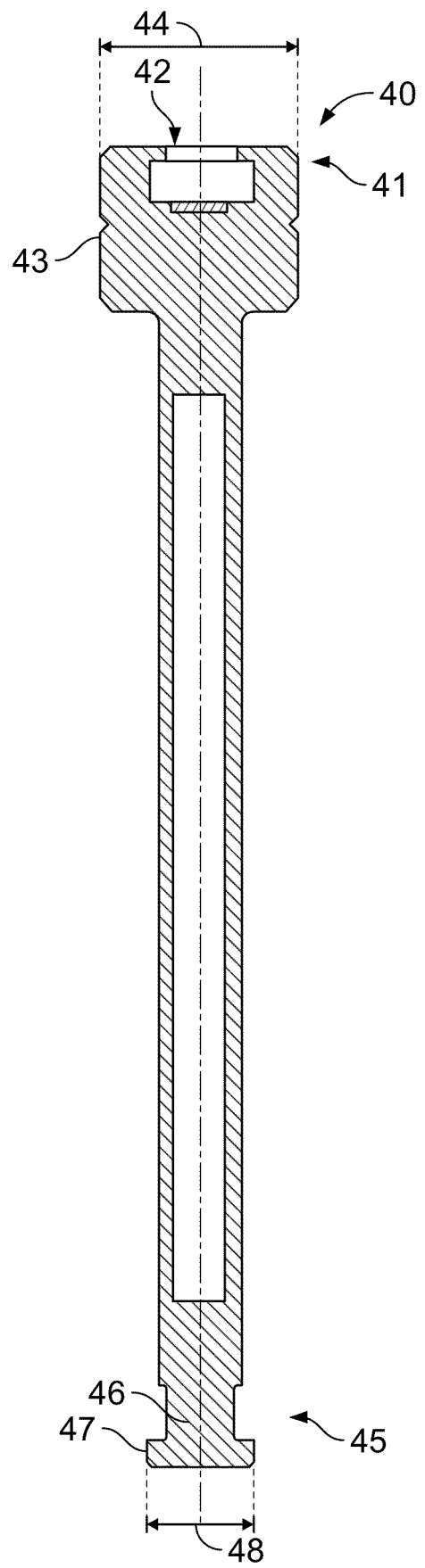
FIG. 3 a prior stem for a globe valve.

FIG. 3 is a cross-sectional view of a previously-known design of stem 40 for another globe valve. Stem includes first end 41 and second end 45 opposite first end 41. First end 41 defines slot 42 and has outer radial surface 43 with diameter 44. Second end 45 defines head 46 and has outer radial surface 47 with diameter 48. As illustrated in FIG. 3, diameter 44 is different than diameter 48. More specifically, diameter 44 is significantly greater than diameter 48.

Stem 40 is modular such that two stems 40 can be coupled together in an axial manner by inserting head 46 of one stem 40 into slot 42 of another stem 40. However, the different diameters 44, 48 of first and second ends 41, 45, respectively, may result in misalignment or tilting of one or more stems 40 relative to a longitudinal axis of the globe valve, which may become exacerbated if more stems 40 are connected together. For instance, if two stems 40 are coupled together, outer radial surface 43 of first end 41 of each stem 40 may engage an inner surface of a bonnet of the globe valve. At the same time, because of the difference in diameters 44, 48 of first and second ends 41, 45, respectively, outer radial surface 47 of second end 45 of each stem 40 is not sized to engage the inner surface of the bonnet. Because the second end 45 of each stem 40 does not securely engage the inner surface of the bonnet, each stem 40 may tilt or become misaligned relative to the longitudinal axis of the globe valve, which may result in unintended leaking of fluid around stem 40.

Figure 4:
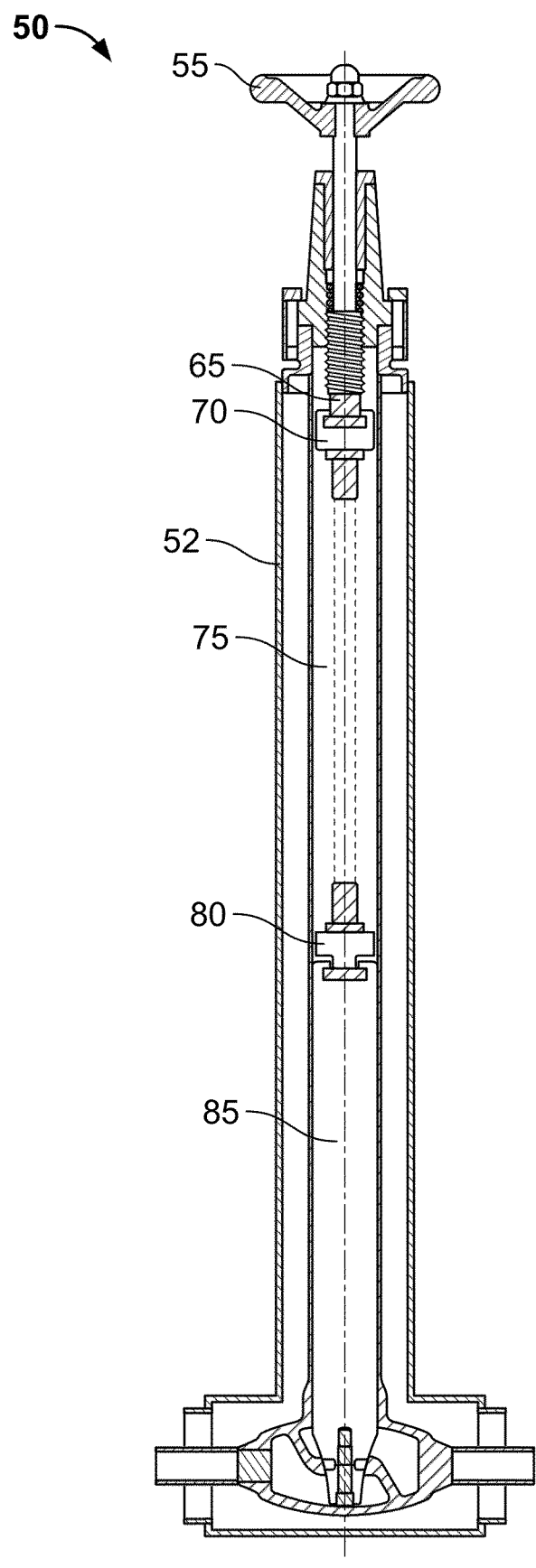
FIG. 4 depicts another prior globe valve.
Figure 5:
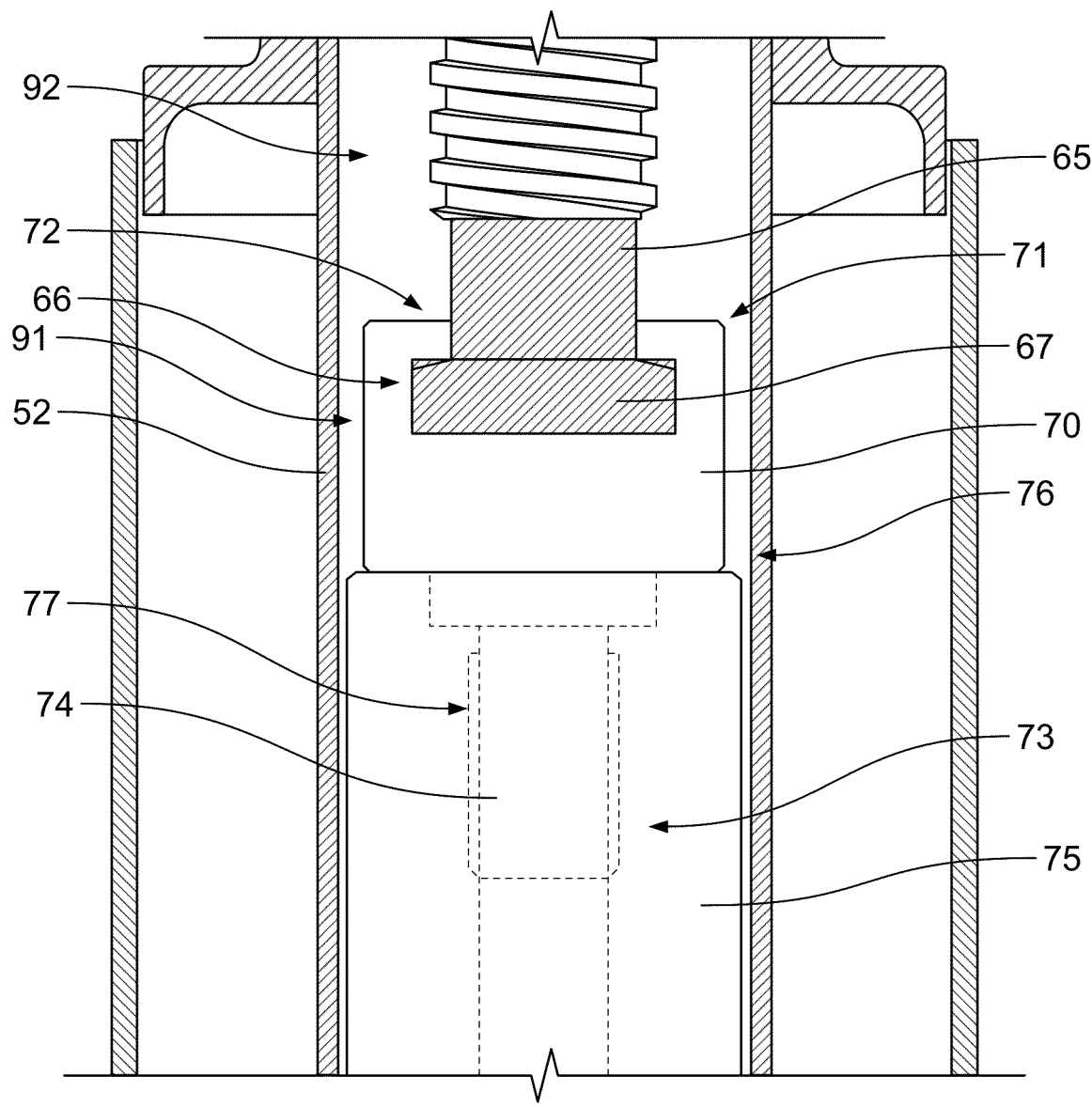
FIG. 5 is an expanded view of a portion of a stem of the prior globe valve of FIG. 4.
Figure 6:
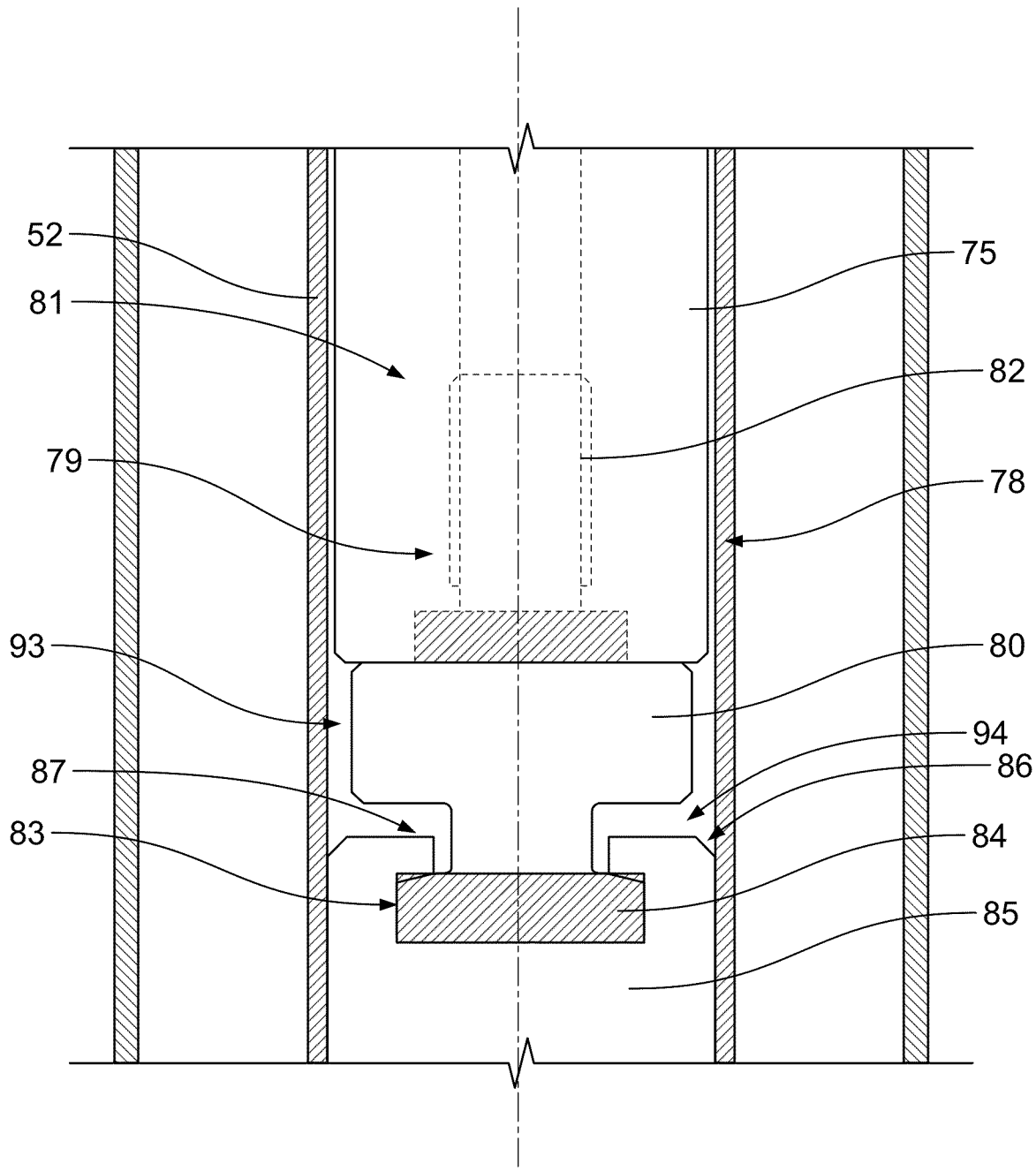
FIG. 6 is an expanded view of another portion of a stem of the prior globe valve of FIG. 4.

FIG. 4-6 depict another previously-known design of globe valve 50. As most clearly shown in FIG. 4, globe valve 50 includes handle 55, plug 90, and stem assembly 60 extending between handle 55 and plug 90. Stem assembly 60 includes first stem segment 65, first connector 70, second stem segment 75, second connector 80, and third stem segment 85. Handle 55 is connected to first stem segment 65, which is connected to second stem segment 75 via first connector 70. Plug 90 is connected to third stem segment 85, which is connected to second stem segment 75 via second connector 80.

FIG. 5 is an expanded view of first connector 70 connecting first stem segment 65 and second stem segment 75 together. First stem segment 65 has end 66 with head 67, and second stem segment 75 includes first end 76 with threaded hole 77. First connector 70 includes first end 71 with slot 72 and second end 73 with threaded shaft 74. To couple first stem segment 65 to second stem segment 75, threaded shaft 74 of first connector 70 is inserted into threaded hole 77 of second stem segment 75 and slot 72 of first connector 70 receives head 67 of first stem segment 65.

The requirement of an additional component, namely first connector 70, to couple first stem segment 65 and second stem segment 75 together may increase the likelihood and/or amount of misalignment or tilting of those segments relative to a longitudinal axis of globe valve 50, which may increase the likelihood and/or amount of unintended leaking of fluid around stem segments 65, 75. Additionally, the inclusion of first connector 70 results in gap 91 formed between first connector 70 and bonnet 52 of globe valve 50. Gap 92 also is formed between end 66 of first stem segment 65, body of first connector 70, and bonnet 52 of globe valve 50. Gaps 91, 92 that are formed adjacent the connection between first stem segment 65 and second stem segment 75 may result in misalignment or tilting of one or more stem segments 65, 75, which may become exacerbated if more stem segments, such as third stem segment 85, are added to form stem assembly 60.

FIG. 6 is an expanded view of second connector 80 connecting second stem segment 75 and third stem segment 85 together. Second stem segment 75 includes second end 78 with threaded hole 79, and third stem segment 85 includes end 86 with slot 87. Second connector 80 includes first end 81 with threaded shaft 82 and second end 83 with head 84. To couple second stem segment 75 to third stem segment 85, threaded shaft 82 of second connector 80 is inserted into threaded hole 79 of second stem segment 75 and head 84 of second connector 80 is received by slot 87 of third stem segment 85.

The requirement of an additional component, namely second connector 80, to couple second stem segment 75 and third stem segment 85 together may increase the likelihood and/or amount of misalignment or tilting of those segments relative to a longitudinal axis of globe valve 50, which may increase the likelihood and/or amount of unintended leaking of fluid around stem segments 75, 85. Additionally, the inclusion of second connector 80 results in gap 93 formed between second connector 80 and bonnet 52 of globe valve 50. Gap 94 also is formed between end 86 of third stem segment 85 and body of second connector 80. Gaps 93, 94 that are formed adjacent the connection between second stem segment 75 and third stem segment 85 may result in misalignment or tilting of one or more stem segments 75, 85, which may become exacerbated if more stem segments, such as first stem segment 65, are added to form stem assembly 60.

Figure 11:
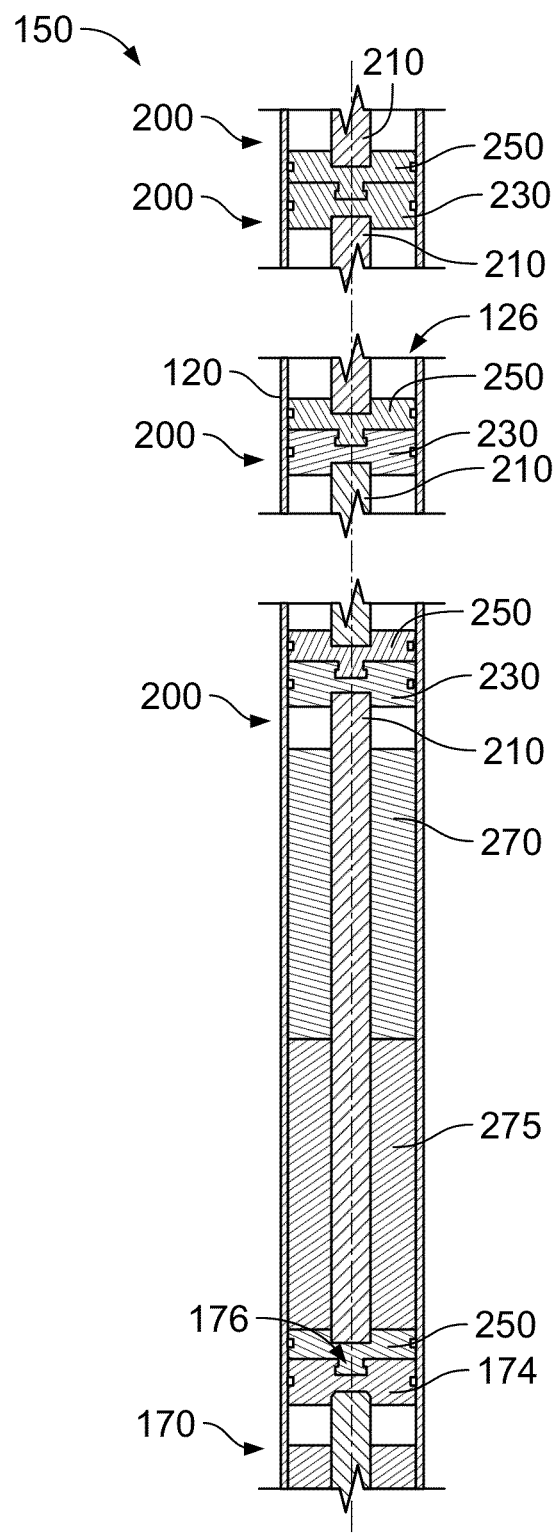
FIG. 11 is an expanded cross-sectional view of an intermediate portion (portion B) of the valve of FIG. 9.
Figure 12:
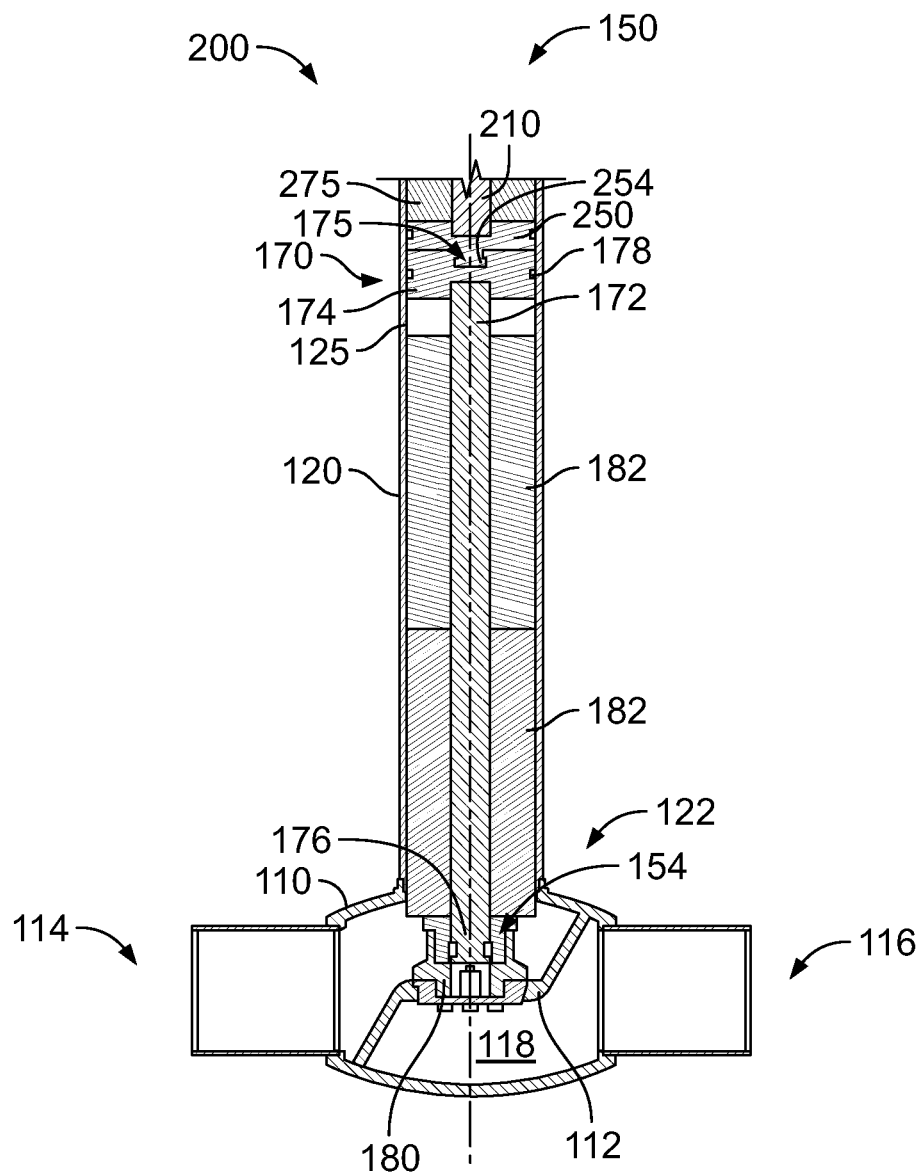
FIG. 12 is an expanded cross-sectional view of a lower portion (portion C) of the valve of FIG. 9.

Turning to FIGS. 7-23, example valve 100 is disclosed in accordance with the teachings herein. In the illustrated example, valve 100 is a cryogenic valve that is configured to control the flow of cryogenic fluid. Further, valve 100 is a globe valve with plug 180 and valve seat 112 (FIG. 12). Valve 100 includes valve stem 150 that is formed, at least partially, by one or more modular stem assemblies 200. A plurality of modular stem assemblies 200 can be connected together to extend valve stem 150 to various lengths. In turn, valve stem 150 is capable of extending from handle 130, which is aboveground, to a flow path fluidly connected to a cryogenic tank, which is buried deep belowground for safe storage. As disclosed below in greater detail, modular stem assemblies 200 are deterred from tilting and/or becoming misaligned within bonnet 120 of valve 100 and, in turn, cryogenic fluid is impeded from leaking from body 110 of valve 100 and up through bonnet 120.

Figure 7:
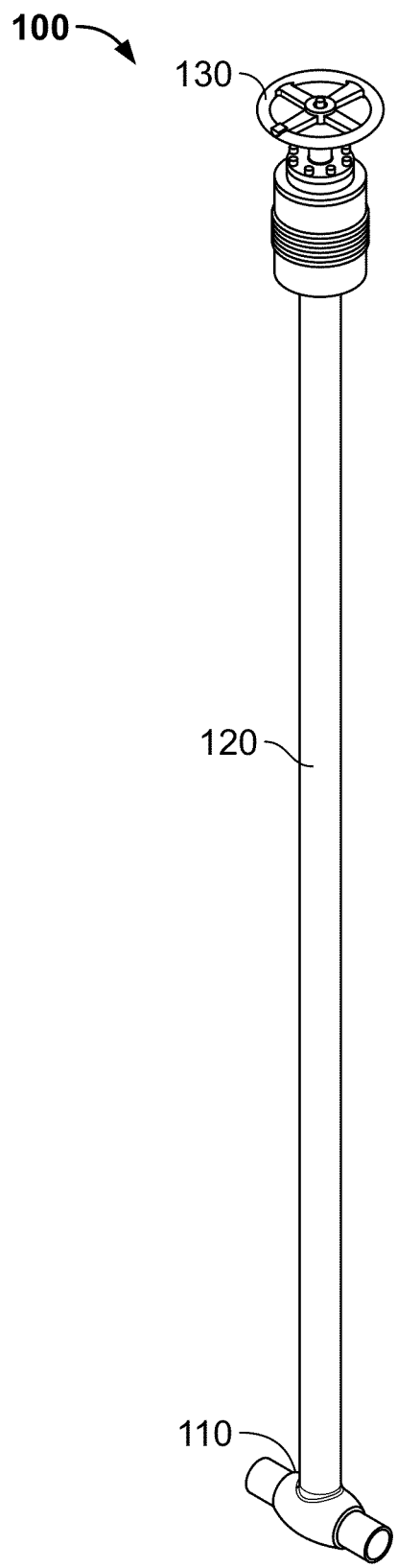
FIG. 7 is a perspective view of an example valve in accordance with the teachings herein.
Figure 8:
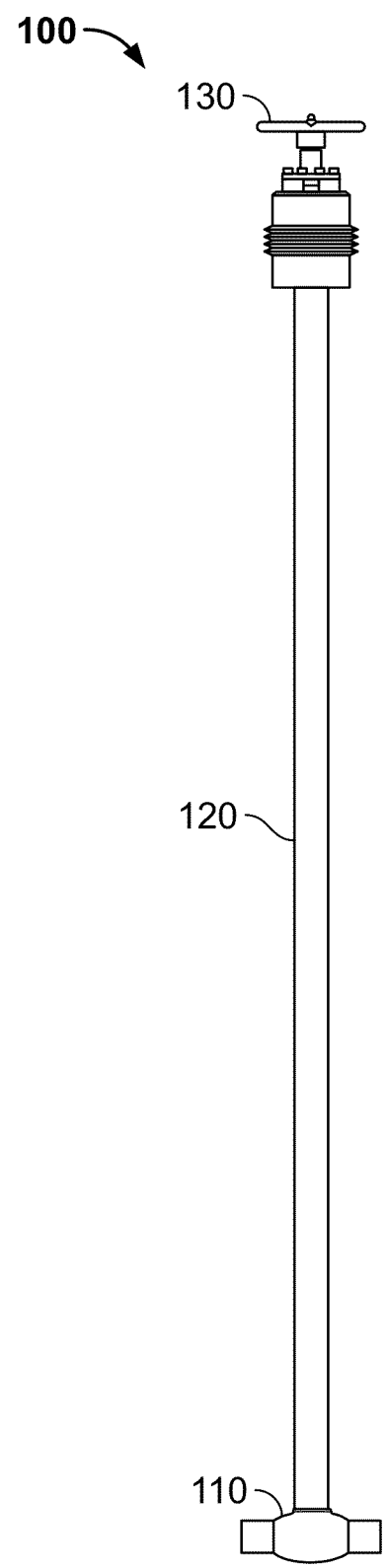
FIG. 8 is a front view of the valve of FIG. 7.
Figure 9:
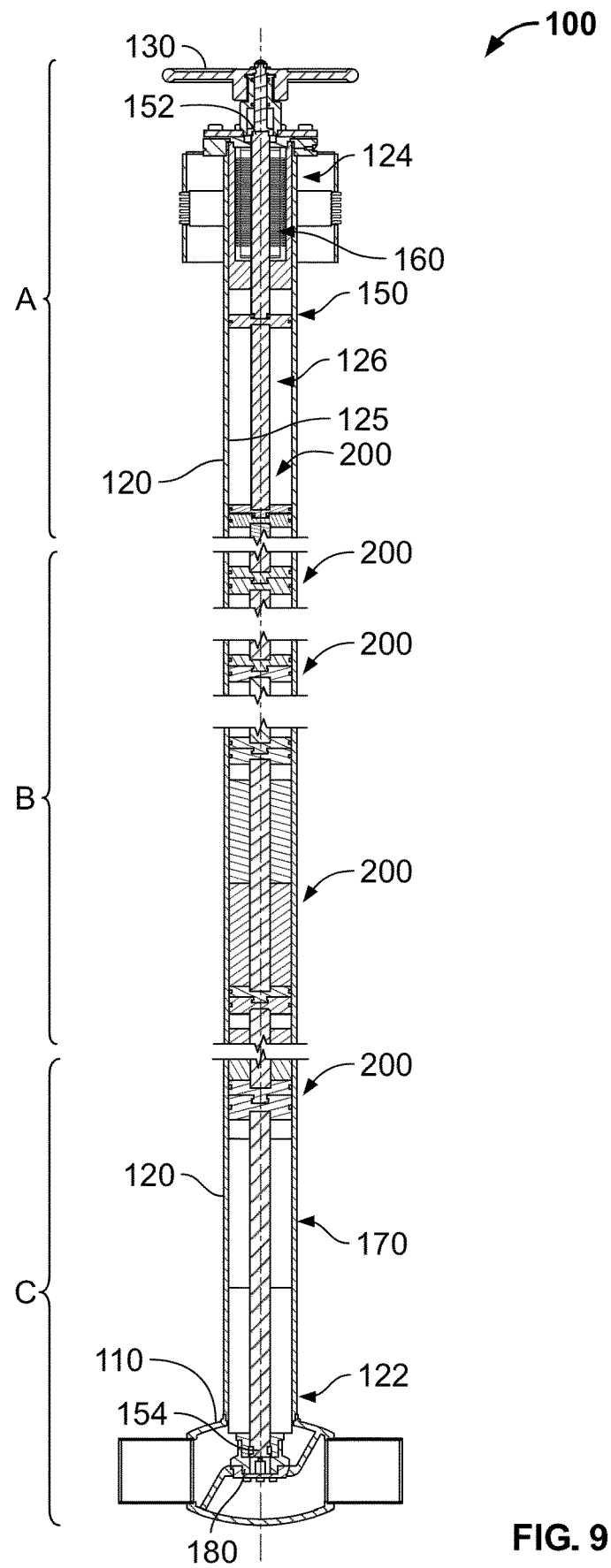
FIG. 9 is a cross-sectional view of the valve of FIG. 7.
Figure 10:
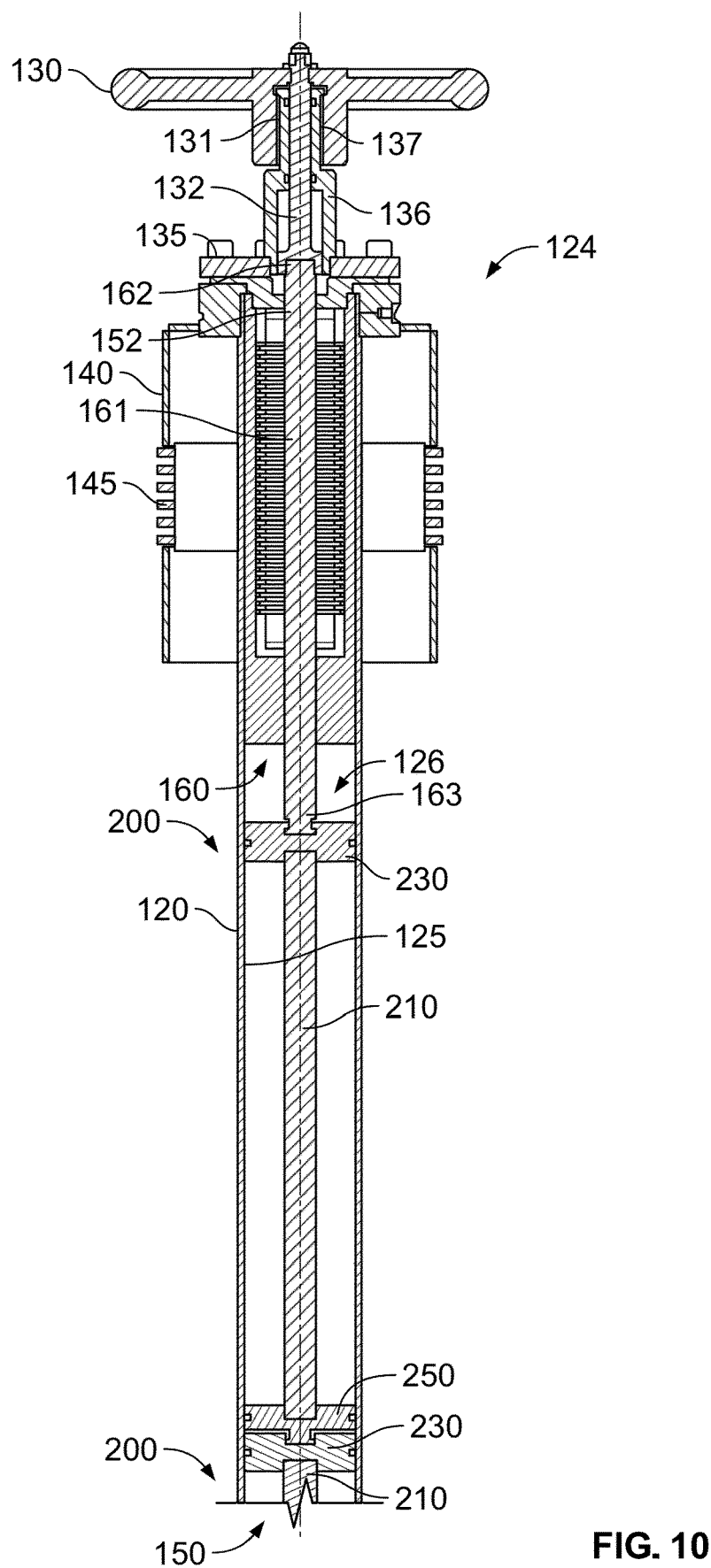
FIG. 10 is an expanded cross-sectional view of an upper portion (portion A) of the valve of FIG. 9.

FIGS. 7-8 depict a perspective view and a front view, respectively, of valve 100. FIGS. 9-12 are cross-sectional views of valve 100. In particular, FIG. 9 is a cross-sectional view of valve 100. FIG. 10 is an expanded cross-sectional view of an upper portion, identified as portion A in FIG. 9, of valve 100. FIG. 11 is an expanded cross-sectional view of an intermediate portion, identified as portion B in FIG. 9, of valve 100. FIG. 12 is an expanded cross-sectional view of an upper portion, identified as portion A in FIG. 9, of valve 100.

As shown in FIG. 9, valve 100 includes body 110, bonnet 120, handle 130, valve stem 150, and plug 180. Bonnet 120 includes lower end 122 and upper end 124. Lower end 122 of bonnet 120 is coupled to body 110 (also referred to as "valve body"). Handle 130 is positioned adjacent to upper end 124 of bonnet 120. Bonnet 120 includes inner surface 125 (also referred to as "inner bonnet surface") that defines stem chamber 126 through which valve stem 150 extends.

Valve stem 150 includes upper end 152 and lower end 154. Handle 130 is connected to upper end 152 of valve stem 150, and plug 180 is connected to lower end 154 of valve stem 150. In the illustrated example, handle 130 is a rotating handle such as a handwheel. Valve 100 is configured such that when an operator rotates handle 130, valve stem 150 causes plug 180 to transition between an open position and closed position to affect the flow of cryogenic fluid through body 110. As disclosed below in greater detail, valve stem 150 is formed by a plurality of stem assemblies that are stacked together axially in an end-to-end manner to extend between and operatively connect handle 130 and plug 180. In the illustrated example, the plurality of stem assemblies of valve stem 150 include upper stem assembly 160, lower stem assembly 170, and one or more modular stem assemblies 200 extending between upper stem assembly 160 and lower stem assembly 170.

Turning to FIGS. 13-23, each modular stem assembly 200 includes stem 210, disk connector 230, and disk connector 250. That is, valve stem 150 is at least partially formed by one or more modular stem assemblies 200, with each modular stem assembly 200 including respective stem 210. In some examples, each modular stem assembly 200 has the same length. In other examples, modular stem assemblies 200 may have different lengths. For examples, one modular stem assembly 200 has a first length, and another modular stem assembly 200 has a different second length. Further, as illustrated in FIGS. 13-14, stem 210 includes a first end and an opposing second end. Disk connectors 230, 250 are positioned at opposing ends of stem 210. Each disk connector 230, 250 has an outer diameter that is less than that of stem 210.

Disk connector 230 (also referred to as "first disk connector") defines hole 232 and slot 234. Hole 232 is configured to securely receive an end of stem 210 (e.g., press fit) to connect disk connector 230 to stem 210. Slot 234 of each modular stem assembly 200 is a modular slot that is identical to respective slots 234 of the other modular stem assemblies 200. Slot 234 is also identical to slot 175 of lower stem assembly 170. Slot 234 is configured to securely receive a modular head of another stem assembly (e.g., head 254 of another modular stem assembly 200, a head of upper stem assembly 160 of FIG. 10) to securely couple modular stem assembly 200 to another stem assembly.

Disk connector 250 (also referred to as "second disk connector") defines hole 252 and includes head 254. Hole 252 is configured to securely receive another end of stem 210 (e.g., press fit) to connect disk connector 250 to stem 210. Head 254 of each modular stem assembly 200 is a modular head that is identical to heads 254 of the other modular stem assemblies 200. Head 254 is also identical to the head of upper stem assembly 160. Head 254 is configured to be securely received by a modular slot of another stem assembly (e.g., slot 234 of another modular stem assembly 200, slot 175 of lower stem assembly 170 of FIG. 12) to securely couple modular stem assembly 200 to another stem assembly.

In the illustrated example, modular stem assembly 200 is oriented such that disk connector 230 is an upper disk connector that is coupled to an upper end of stem 210 and disk connector 250 is a lower disk connector that is coupled to a lower end of stem 210. In other examples, modular stem assembly 200 may be positioned such that disk connector 250 is the upper disk connector that is coupled to the upper end of stem 210 and disk connector 230 is the lower disk connector that is coupled to the lower end of stem 210.

Disk connector 230 includes outer radial surface 235, and disk connector 250 includes outer radial surface 255. Disk connector 230 has an outer diameter and is positioned within stem chamber 126 such that outer radial surface 235 consistently contacts inner surface 125 of bonnet 120 as modular stem assembly 200 slides within stem chamber 126. That is, outer radial surface 235 is defined by the outer diameter to slidably engage inner surface 125 of bonnet 120. Similarly, disk connector 250 has the same outer diameter and is positioned within stem chamber 126 such that outer radial surface 255 consistently contacts inner surface 125 of bonnet 120 as modular stem assembly 200 slides within stem chamber 126. That is, outer radial surface 255 is defined by the same outer diameter as that of outer radial surface 235 to slidably engage inner surface 125 of bonnet 120. By consistently contacting inner surface 125 of bonnet 120 as modular stem assembly 200 slides within stem chamber 126, disk connectors 230, 250 are configured to deter modular stem assembly 200 of valve stem 150 of valve 100 from tilting and/or becoming misaligned over time. That is, to deter misalignment and/or tilting, (1) disk connector 230 is configured slidably engage inner surface 125 of bonnet 120 and securely engage a portion of an adjacent stem assembly (e.g., upper stem assembly 160 or disk connector 250 of another modular stem assembly 200) and (2) disk connector 250 is configured slidably engage inner surface 125 of bonnet 120 and securely engage a portion of another adjacent stem assembly (e.g., lower stem assembly 170 or disk connector 250 of another modular stem assembly 200). By deterring tilting and/or misaligned of valve stem 150, modular stem assembly 200 impedes cryogenic fluid from leaking from body 110 and up through bonnet 120 that may otherwise occur with such tilting and/or misalignment.

Additionally, modular stem assembly 200 of the illustrated example includes seals 245, 265 (e.g., O-rings). Seal 245 is positioned to engage and extend circumferentially about outer radial surface 235 of disk connector 230, and seal 265 is positioned to engage and extend circumferentially about outer radial surface 255 of about disk connector 250. When modular stem assembly 200 is in place within stem chamber 126 of bonnet 120, seal 245 is positioned to sealingly engage inner surface 125 of bonnet 120 to form a sealed connection between disk connector 230 and bonnet 120. Similarly, seal 265 is positioned to sealingly engage inner surface 125 of bonnet 120 to form a sealed connection between disk connector 250 and bonnet 120.

Figure 15:
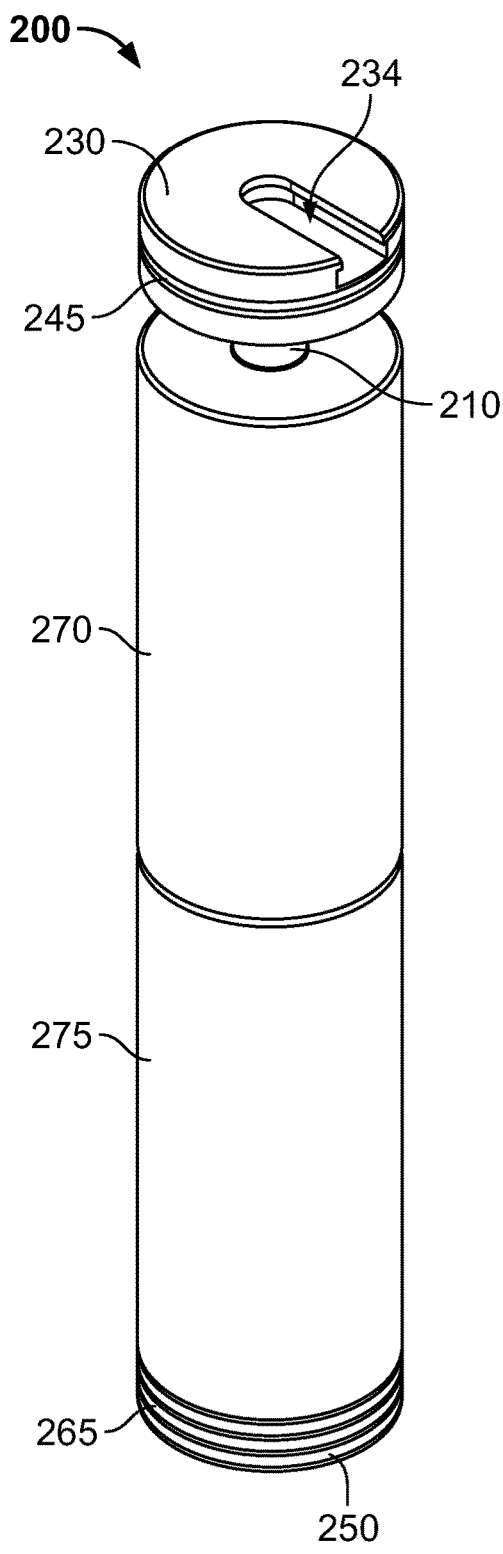
FIG. 15 is a perspective view of the modular stem assembly of FIG. 13 with buffers.
Figure 16:
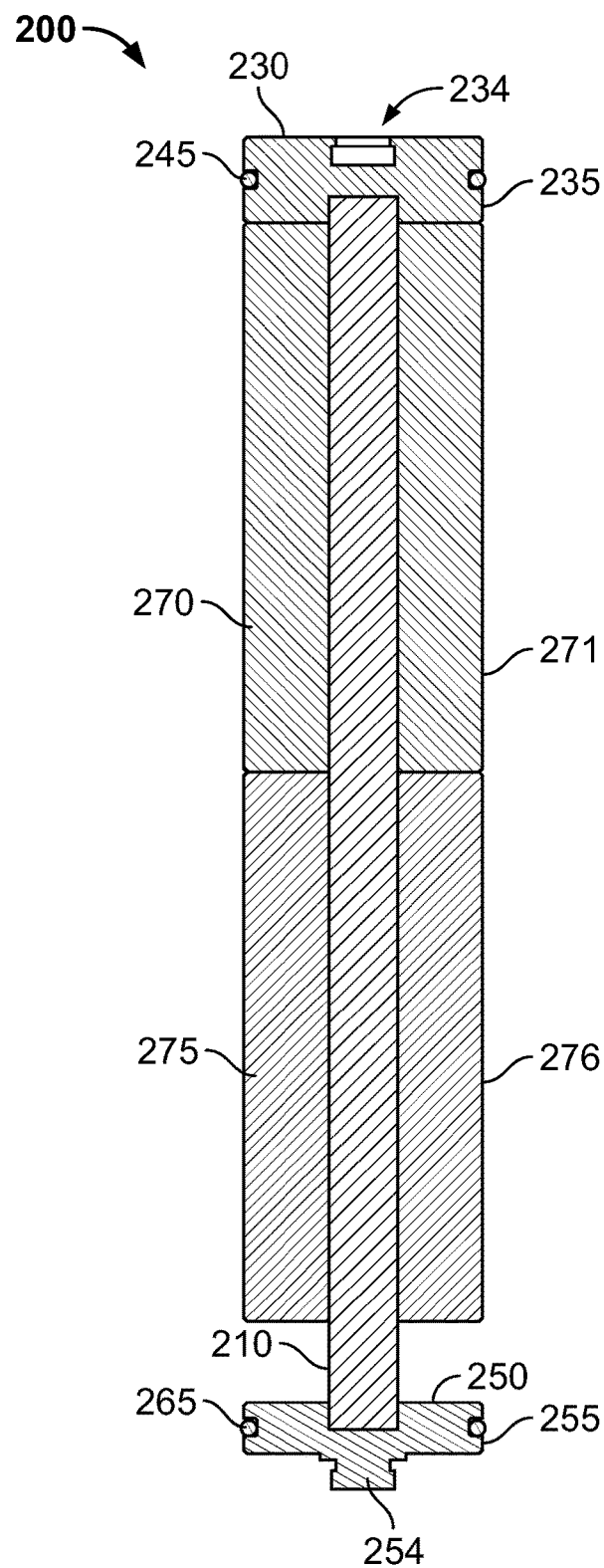
FIG. 16 is a cross-sectional view of the modular stem assembly as shown in FIG. 15.

In FIGS. 15-16, modular stem assembly 200 is depicted with one or more buffers. In the illustrated example, modular stem assembly 200 includes buffers 270, 275. For example, as shown in FIGS. 9 and 11, one modular stem assembly 200 that is located in the middle portion of valve 100 includes buffers 270, 275. Returning to FIGS. 15-16, each buffer 270, 275 is positioned circumferentially about and engages stem 210. Each buffer 270, 275 is stacked axially between disk connectors 230, 250 along stem 210. In the illustrated example, buffers 270, 275 abut each other in an end-to-end manner. The length of each buffer 270, 275 is less than that of stem 210. In the illustrated example, the combined length of buffers 270, 275 is less than stem 210 such that a gap is formed between one buffer 270, 275 and an adjacent disk connector 230, 250. In FIG. 15, buffers 270, 275 are sized and positioned such that a gap is formed between buffer 270 and disk connector 230. In FIG. 16, buffers 270, 275 are sized and positioned such that a gap is formed between buffer 275 and disk connector 250.

In the illustrated example, each buffer 270, 275 includes a respective outer radial surface 271, 276 (also referred to as "outer surfaces" of buffers 270, 275) that are defined by the same outer diameter as disk connectors 230, 250. That is, buffers 270, 275 have the same outer diameter as disk connectors 230, 250 such that outer radial surface 271, 276 are flush with and/or otherwise align with outer radial surfaces 235, 255 of disk connectors 230, 250. In turn, outer radial surfaces 271, 276 of buffers 270, 275 are configured to slidably engage inner surface 125 of bonnet 120, when outer radial surfaces 235, 255 of disk connectors 230, 250 contact inner surface 125 of bonnet 120, to further deter modular stem assembly 200 of valve stem 150 of valve 100 from tilting and/or becoming misaligned over time.

To assemble modular stem assembly 200 with buffers 270, 275, one disk connector 230, 250 is securely fastened to a respective end of stem 210. Buffers 270, 275 are the slid onto stem 210 via the opposing open end of stem 210. Once buffers 270, 275 are slid onto stem 210, the other disk connector 230, 250 is securely fastened onto the opposing end of stem 210 to enclose buffers between disk connectors 230, 250.

In the illustrated example, modular stem assembly 200 includes two buffers 270, 275 with equal lengths. In other examples, buffers 270, 275 may have different lengths. Additionally or alternatively, modular stem assembly 200 may include fewer or more buffers. For example, as illustrated in FIGS. 13-14, some modular stem assemblies may include no buffers.

Figure 17:
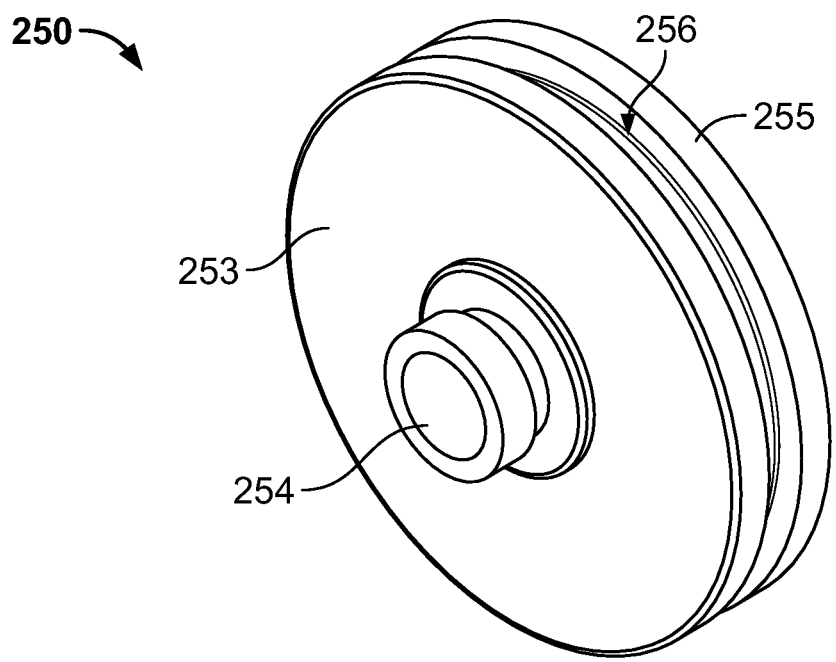
FIG. 17 is a perspective view of a disk connector of the modular stem assembly of FIG. 13.
Figure 18:
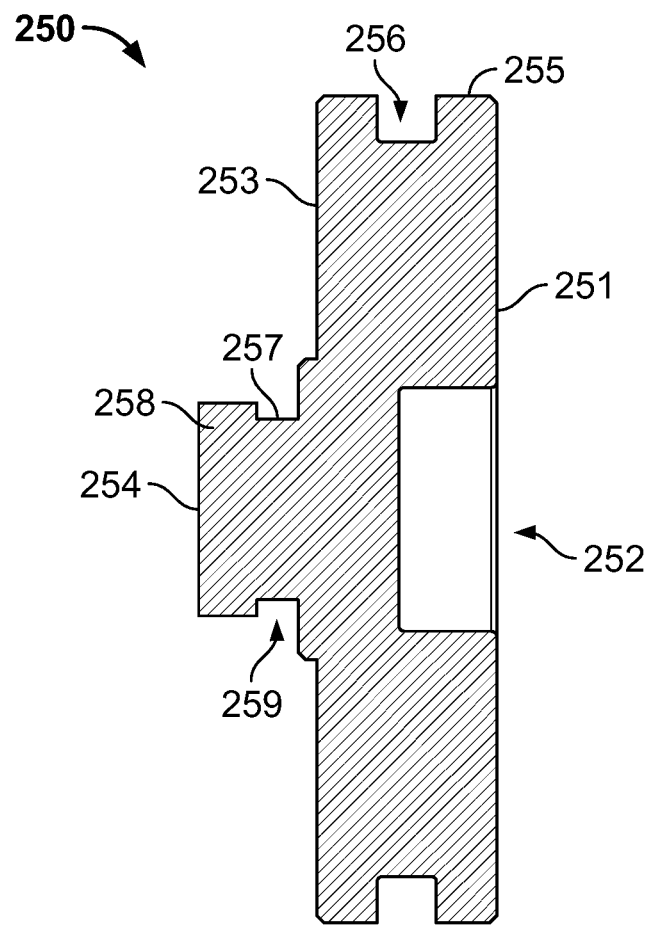
FIG. 18 is a cross-sectional view of the disk connector of FIG. 17.

FIGS. 17-18 further depict disk connector 250 of modular stem assembly 200. Disk connector 250 includes inner surface 251 (also referred to as "inner-facing surface"), outer surface 253 (also referred to as "outward-facing surface"), and outer radial surface 255. Outer surface 253 is opposite inner surface 251, and outer radial surface 255 is perpendicular to and extends between inner surface 251 and outer surface 253.

Disk connector 250 defines groove 256 that extends circumferentially along outer radial surface 255. As illustrated in FIGS. 13-16, seal 265 is securely housed within groove 256. Returning to FIGS. 17-18, hole 252 of disk connector 250 is defined along inner surface 251, and head 254 of disk connector 250 extends outwardly from outer surface 253. In the illustrated example, hole 252 and head 254 are centrally located along a center axis of disk connector 250.

Further, as most clearly shown in FIG. 18, head 254 includes neck 257 that extends outwardly and perpendicularly from outer surface 253 of disk connector 250. Head 254 includes rim 258 that extends radially outward. Neck 257 is at a proximal end of head 254, and rim 258 is at a distal end of head 254. Neck 257 and rim 258 are arranged such that head 254 has a T-shaped cross-section. Further, groove 259 is defined between neck, 257, rim 258 of head 254, and outer surface 253. As disclosed below in greater detail, head 254 and groove 259 are arranged to facilitate a secure connection between disk connector 250 and another disk connector (e.g., disk connector 230 of modular stem assembly 200, disk connector 174 of lower stem assembly 170). That is, head 254 has a T-shaped cross-section to enable modular stem assembly 200 to securely connect to another stem assembly.

Figure 19:
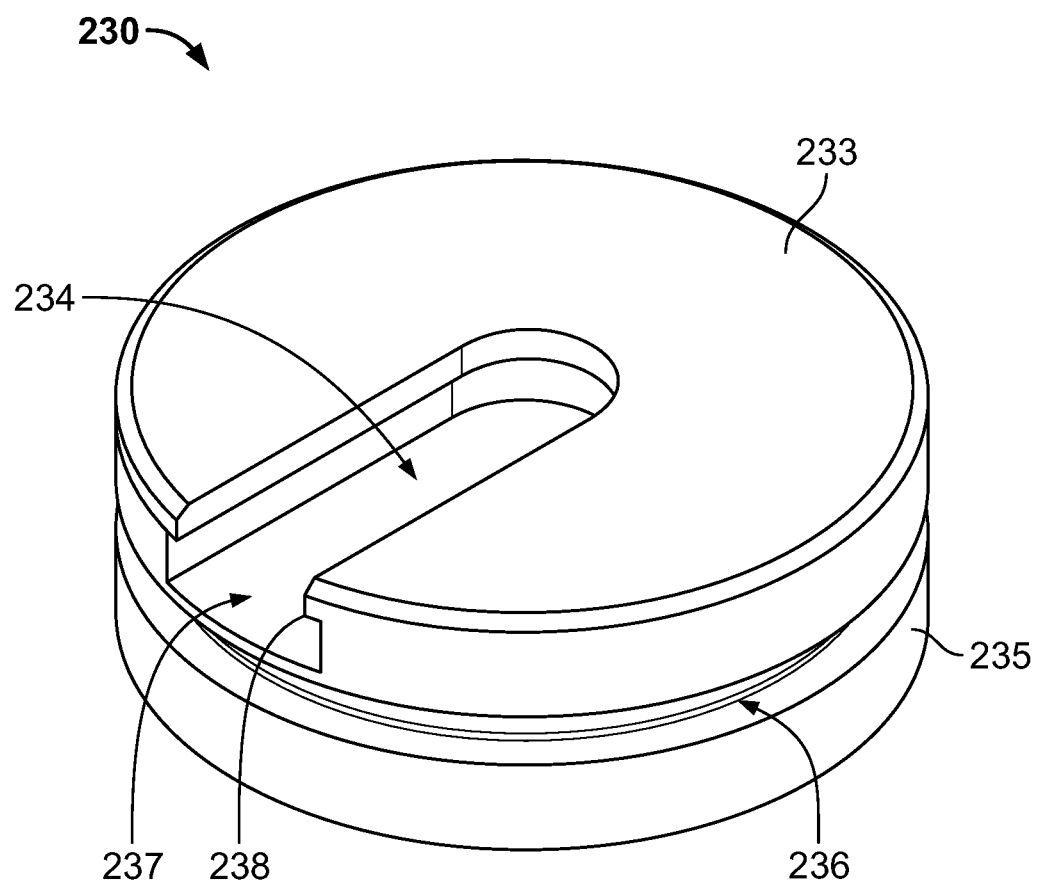
FIG. 19 is a perspective view of another disk connector of the modular stem assembly of FIG. 13.
Figure 20:
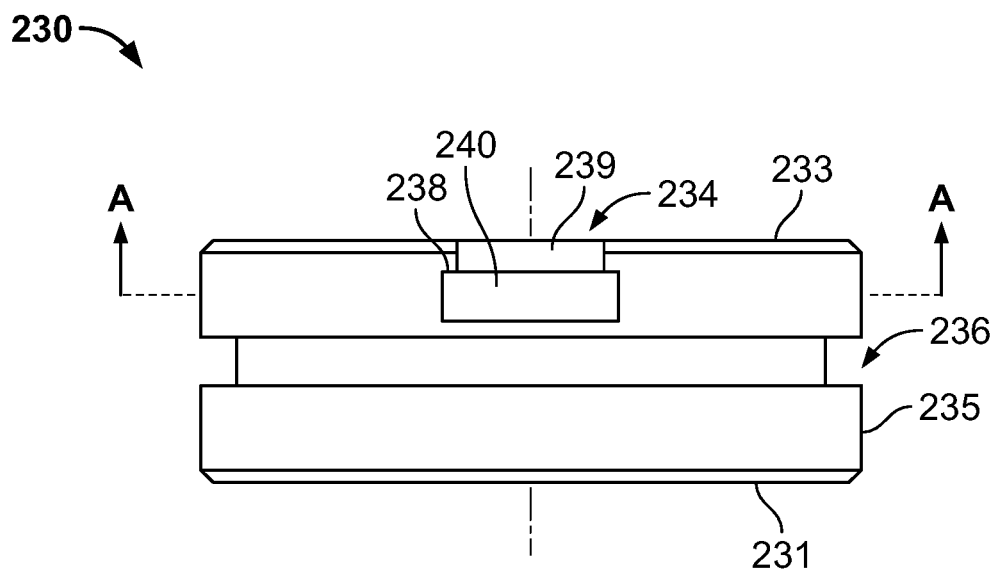
FIG. 20 is a front view of the disk connector of FIG. 19.
Figure 21:
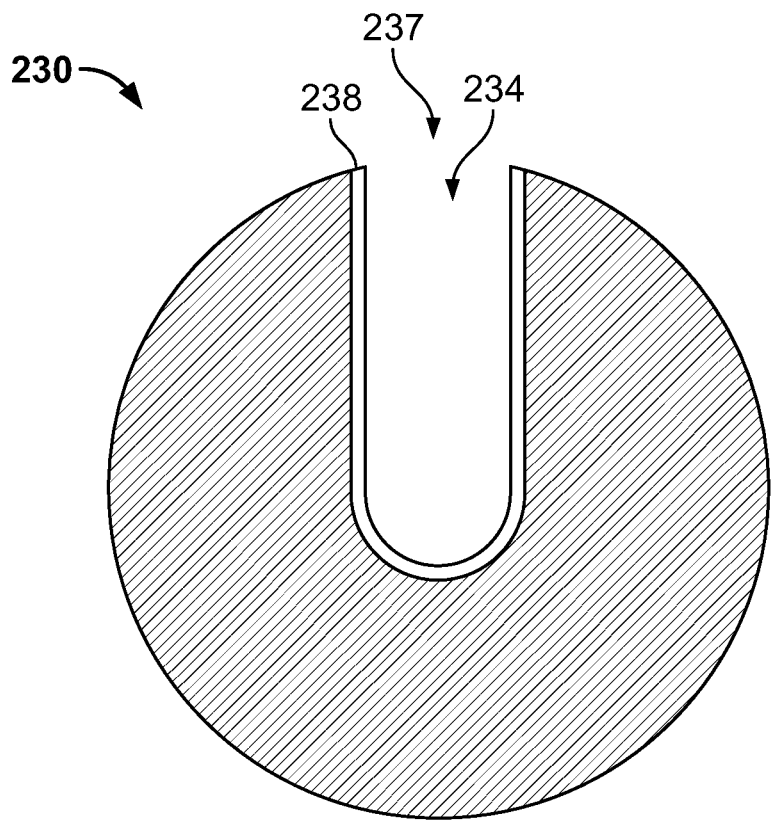
FIG. 21 is a first cross-sectional view of the disk connector taken along plane A-A of FIG. 20.
Figure 22:
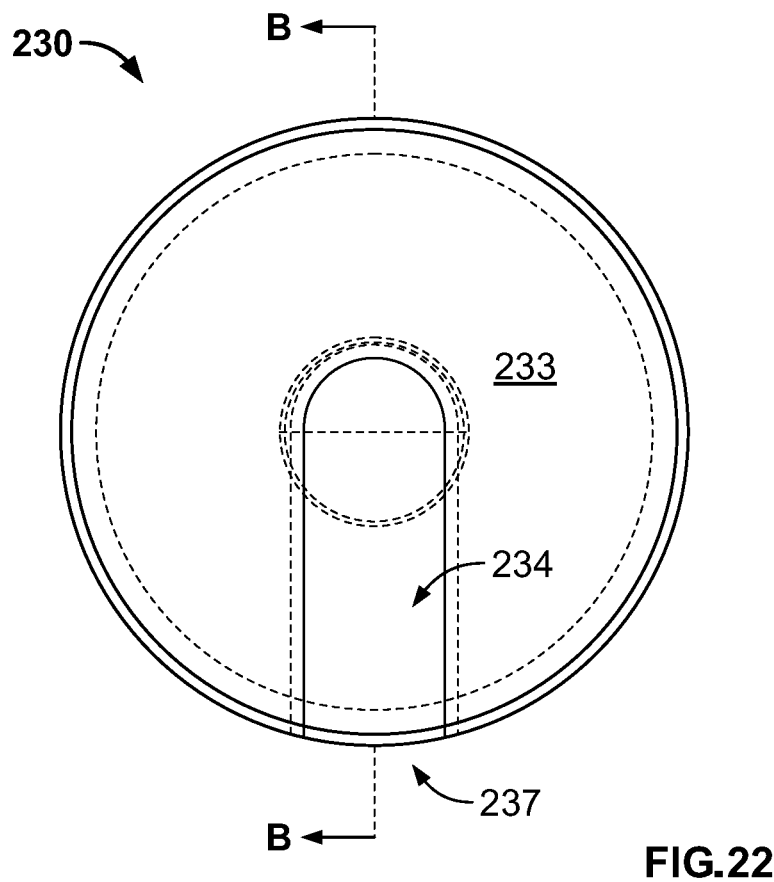
FIG. 22 is a bottom view of the disk connector of FIG. 19.
Figure 23:
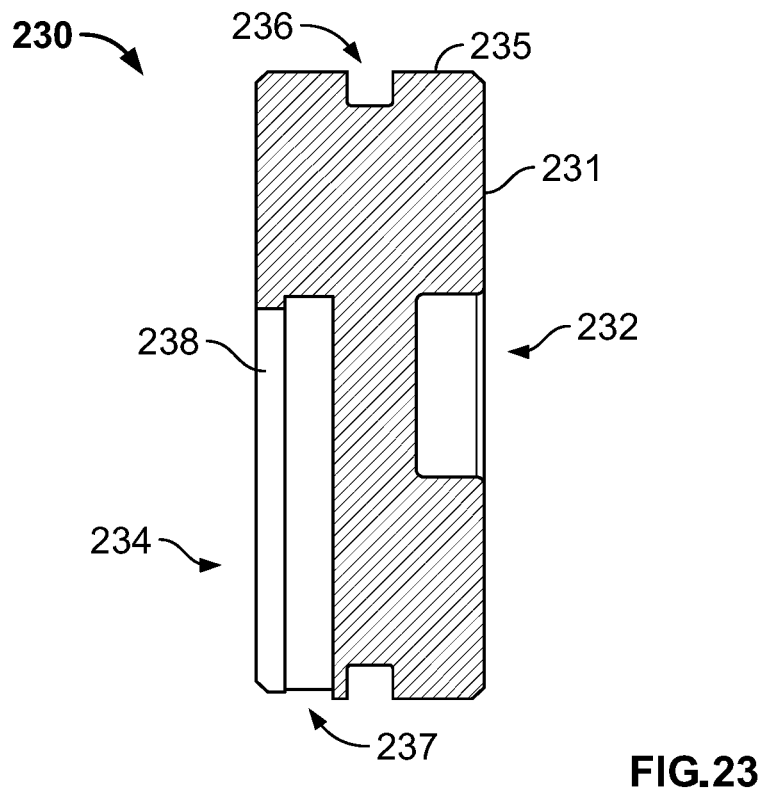
FIG. 23 is a second cross-sectional view of the disk connector taken along plane B-B of FIG. 22.

FIGS. 19-23 further depict disk connector 250 of modular stem assembly 200. In particular, FIG. 19 is a perspective view of disk connector 230, FIG. 20 is a front view of disk connector 230, FIG. 21 is a cross-sectional view of disk connector 230 taken along plane A-A of FIG. 20, FIG. 22 is a bottom view of disk connector 230, and FIG. 23 is another cross-sectional view of disk connector 230 taken along plane B-B of FIG. 22.

Disk connector 230 includes inner surface 231 (also referred to as "inner-facing surface"), outer surface 233 (also referred to as "outward-facing surface"), and outer radial surface 235. Outer surface 233 is opposite inner surface 231, and outer radial surface 235 is perpendicular to and extends between inner surface 231 and outer surface 233.

Disk connector 230 defines groove 236 that extends circumferentially along outer radial surface 235. As illustrated in FIGS. 13-16, seal 245 is securely housed within groove 236. Returning to FIGS. 19-23, hole 232 of disk connector 230 is defined along inner surface 231. In the illustrated example, hole 232 is centrally located along a center axis of disk connector 230.

Further, as most clearly shown in FIGS. 19-20, outer surface 233 of disk connector 230 defines slot 234 that extends from opening 237 to a closed end. Opening 237 is defined by outer radial surface 235, and the closed end is located centrally along a center axis of disk connector 230. In turn, slot 234 is arranged to extend along outer surface 233 in a radially-outward direction from the center axis of disk connector 230. Disk connector 230 includes ledge 238 that extends the length of slot 234. In the illustrated orientation, ledge 238 extends over a portion of slot 234. In an opposing orientation, ledge 238 extends below a portion of slot 234.

As shown in FIG. 20, slot 234 and ledge 238 are arranged such that slot 234 has a T-shaped cross-section. Slot 234 includes outer portion 239 that extends between opposing sides of ledge 238 and adjacent inner portion 240. Slot 234 also includes inner portion 240 that is located below ledge 238 in the illustrated orientation (and is located above ledge 238 in an opposing orientation). Slot 234 and ledge 238 are arranged to facilitate disk connector 230 in securely connecting to other stem assemblies (e.g., another modular stem assembly 200, upper stem assembly 160) in an end-to-end manner. In particular, slot 234 and ledge 238 are arranged to securely receive a head of another stem assembly. That is, slot 234 has a T-shaped cross-section to enable modular stem assembly 200 to securely connect to another stem assembly.

To connect one modular stem assembly 200 to another stem assembly (e.g., another modular stem assembly 200, upper stem assembly 160), the head of the other stem assembly is slid into slot 234 of disk connector 230 via opening 237. For example, head 254 of disk connector 250 of another modular stem assembly 200 is slid into slot 234 of disk connector 230 of this modular stem assembly 200 via opening 237. Slot 234 is arranged such that inner portion 240 of slot 234 slidably receives rim 258 of head 254 and outer portion 239 receives neck 257 of head 254. As head 254 is slid into slot 234, ledge 238 extends into groove 259 between rim 258 and outer surface 253 to prevent modular stem assemblies 200 from disconnecting in an axial direction.

Additionally, when modular stem assemblies 200 are securely connected together via a slot 234 and respective head 254, outer surface 233 of disk connector 230 of one modular stem assembly 200 contacts outer surface 253 of disk connector 250 of another modular stem assembly 200 in a manner that deters tilting or misalignment between the two modular stem assemblies 200. Additionally, outer radial surface 235 of disk connector 230 aligns with outer radial surface 255 of disk connector 250 such that both outer radial surfaces 235, 255 contact inner surface 125 of bonnet 120 to deter tilting or misalignment of the two modular stem assemblies 200 when installed within bonnet 120.

FIGS. 10-12 further depict valve 100 that includes valve stem 150 formed by a plurality of stem assemblies stacked axially in an end-to-end manner. More specifically, FIG. 10 depicts the upper portion A of valve 100 as identified in FIG. 9, FIG. 11 depicts the middle portion B of valve 100 as identified in FIG. 9, and FIG. 12 depicts the lower portion C of valve 100 as identified in FIG. 9. In the illustrated example, the plurality of stem assemblies of valve stem 150 includes upper stem assembly 160, lower stem assembly 170, and one or more modular stem assemblies 200.

As illustrated in FIG. 10, valve 100 includes cap 135 that is securely coupled to upper end 124 of bonnet 120. Valve 100 also includes outer sleeve 140 that is coupled to and extends downwardly from cap 135. For example, an upper end of outer sleeve 140 is coupled to cap 135, and a lower end of outer sleeve 140 is configured to extend to a ground surface. Outer sleeve 140 includes bellows 145 that enables outer sleeve 140 to flex. For example, bellows 145 contracts or expands to cause the length of outer sleeve to decrease or increase, respectively.

In the illustrated example, handle 130 includes internal threads 131. Cap 135 includes upper body 136 with external threads 137. Handle 130 is threadably coupled to upper body 136 of cap 135 via threads 131, 137 such that handle 130 moves axially along upper body 136 is handle 130 is rotated. Valve 100 also includes upper shaft 132 that extends between and is connected to handle 130 and valve stem 150. Valve stem 150 is configured to extend through stem chamber 126 of bonnet 120 and into and/or through cap 135 to connect to upper shaft 132. Handle 130, upper shaft 132, cap 135, and valve stem 150 are configured such that rotation of handle 130 causes axial movement of handle 130 and axial movement of handle 130 causes axial movement of valve stem 150 via upper shaft 132.

FIG. 10 depicts upper stem assembly 160 and one of modular stem assemblies 200 that are connected together axially in an end-to-end manner. Upper stem assembly 160 includes stem 161 (also referred to as "upper stem") with upper end 162 and lower end 163. Upper end 162 is securely coupled to upper shaft 132 to operatively connect upper stem assembly 160 to handle 130. Lower end 163 is securely coupled to modular stem assembly 200. Upper stem assembly 160 also includes gland 164 and buffer 165. that are positioned in stem chamber 126 between upper end 162 and lower end 163 of stem 161.

In the illustrated example, upper end 162 includes a head that is securely received by a slot of upper shaft 132 to connect upper stem assembly 160 to upper shaft 132. Lower end 163 includes a modular head that is securely received by slot 234 of one modular stem assembly 200 to connect upper stem assembly 160 to that modular stem assembly 200. In other examples, upper end 162 may include a slot that is configured to receive a head of upper shaft for a secure connection and/or lower end 163 may include a modular slot that is configured to receive head 254 of one modular stem assembly 200 for a secure connection.

Additionally, the upper portion of FIG. 10 includes one modular stem assembly 200 and a portion of another modular stem assembly 200. Slot 234 of disk connector 230 of one modular stem assembly 200 securely connects to stem 161 of upper stem assembly 160. Head 254 of disk connector 250 of the same modular stem assembly 200 is securely received by slot 234 of disk connector 230 of another modular stem assembly 200 to connect the two modular stem assemblies 200 together in an end-to-end manner.

Turning to the middle portion B of valve 100, FIG. 11 depicts a plurality of modular stem assemblies 200 connected together in an end-to-end manner to form a portion of valve stem 150. In the illustrated example, valve stem 150 includes four modular stem assemblies 200. As detailed above with respect to FIG. 10, an upper-most modular stem assembly 200 couples to upper stem assembly 160. Returning to FIG. 11, a lower-most modular stem assembly 200 couples to lower stem assembly 170. Further, disk connector 250 of the upper-most modular stem assembly 200 securely couples to disk connector 230 of an adjacent modular stem assembly 200. Disk connector 230 of the lower-most modular stem assembly 200 securely couples to disk connector 250 of an adjacent modular stem assembly 200. For each modular stem assembly 200 in the middle, disk connector 230 securely couples to disk connector 250 of an adjacent modular stem assembly 200 and disk connector 250 securely couples to disk connector 230 of another adjacent modular stem assembly 200.

Turning to the lower portion C of valve 100, FIG. 12 further depicts body 110 of valve 100. Body 110 defines inlet 114, outlet 116, and flow path 118 that extends between inlet 114 and outlet 116. Body 110 includes valve seat 112 that is positioned between inlet 114 and outlet 116. Valve seat 112 seat is configured to sealingly engage plug 180 in a manner that controls the flow of cryogenic fluid through body 110 of valve 100. For example, when plug 180 sealingly contacts valve seat 112, plug 180 fluidly separates inlet 114 and outlet 116 to prevent the cryogenic fluid from flowing through body 110. When plug 180 is sealingly disengaged from valve seat 112, plug 180 fluidly connects inlet 114 and outlet 116 to enable the cryogenic fluid to flow through flow path 118 of body 110.

Lower end 122 of bonnet 120 is coupled to body 110. Valve stem 150 extends through bonnet 120 to enable lower end 154 of valve stem 150 to connect to plug 180 within body 110. In the illustrated example, lower portion of valve 100 includes lower stem assembly 170 and a portion of one modular stem assembly 200. Lower stem assembly 170 is connected to plug 180. Lower stem assembly 170 includes stem 172 with an upper end and an opposing lower end. The lower end of stem 172 includes head 176 that is configured to couple to plug 180. The upper end of stem 172 is coupled to disk connector 174 of lower stem assembly 170. Disk connector 174 of lower stem assembly 170 includes slot 175 that is a modular slot configured to securely receive head 254 of the lower-most modular stem assembly 200 of valve stem 150. Disk connector 174 includes an outer surface that contacts outer surface 253 of disk connector 250 of modular stem assembly 200 to deter tilting or misalignment between the lower stem assembly 170 and modular stem assembly 200. Additionally, disk connector 174 includes an outer radial surface and is sized such that it contacts inner surface 125 of bonnet 120 to deter tilting or misalignment of lower stem assembly 170 within bonnet 120.

Lower stem assembly 170 of the illustrated example also includes seal 178 (e.g., an O-ring) that extends around the outer radial surface of disk connector 174 to form a sealed connection between disk connector 174 and bonnet 120. Further, lower stem assembly 170 includes one or more buffers 182. Each buffer 182 is positioned circumferentially about and engages stem 172. Each buffer 182 has the same outer diameter as disk connector 174 such that buffer 182 contacts inner surface 125 to further deter lower stem assembly 170 from tilting and/or becoming misaligned over time.

In the illustrated example of FIGS. 9-12, modular stem assemblies 200 are assembled such that disk connectors 230 are upper disk connectors and disk connectors 250 are lower disk connectors. In other examples, modular stem assemblies 200 may be arranged in the opposing orientation such that disk connectors 250 are upper disk connectors 250 and disk connectors 230 are lower disk connectors. In such examples, lower end 163 of upper stem assembly 160 includes a slot that receives head 254 of the upper disk connector of a modular stem assembly 200, and lower stem assembly 170 includes a head that is received by slot 234 of the lower disk connector of a modular stem assembly 200.

That is, in the illustrated example of FIGS. 9-12, modular stem assemblies 200 are assembled such that disk connectors 230 are upper disk connectors with each respective slot 234 being an upward-facing connector. Further, modular stem assemblies 200 of the illustrated example are assembled such that disk connectors 250 are lower disk connectors with each respective head 254 being a downward-facing connector. Lower end 163 of upper stem assembly 160 includes a downward-facing connector (e.g., a head) that connects to an upward-facing connector of the upper disk connector of a modular stem assembly 200, and lower stem assembly 170 includes an upward-facing connector (e.g., a slot) that connects to the downward-facing connector of the lower disk connector of a modular stem assembly 200.

In other examples, modular stem assemblies 200 are assembled such that disk connectors 230 are lower disk connectors with each respective slot 234 being a downward-facing connector. Further, modular stem assemblies 200 of the illustrated example are assembled such that disk connectors 250 are upper disk connectors with each respective head 254 being an upward-facing connector. Lower end 163 of upper stem assembly 160 includes a downward-facing connector (e.g., a slot) that connects to an upward-facing connector of the upper disk connector of a modular stem assembly 200, and lower stem assembly 170 includes an upward-facing connector (e.g., a head) that connects to the downward-facing connector of the lower disk connector of a modular stem assembly 200.

The terms "upper," "lower," "upward-facing," and "downward-facing" are used above as valve 100 is typically installed vertically, for example, with handle 130 being positioned aboveground and body 10 being positioned belowground. In other examples, valve may be installed in a different orientation. For example, an "upper" object may be a "first" object, a "lower" object may be a "second" object, an "upward-facing" object may be a "first-direction-facing" object, and a "downward-facing" object may be a "second-direction-facing" object.

Exemplary embodiments in accordance with the teachings herein are disclosed below.

Embodiment 1

A cryogenic valve includes a valve body and a bonnet coupled to the valve body and including an inner bonnet surface. The cryogenic valve includes a plug, a handle, and a plurality of stem assemblies stacked axially between and operatively connecting the handle and the plug. The plurality of stem assemblies include an upper stem assembly operatively connected to the handle and including a first head, a lower stem assembly connected to the plug and including a first slot, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular slot for securely coupling to another of the plurality of stem assemblies. The upper disk connector has a first outer radial surface defined by an outer diameter to slidably engage the inner bonnet surface. Each of the one or more modular stem assemblies includes a lower disk connector coupled to the lower end of the stem. The lower disk connector includes a modular head for securely coupling to another of the plurality of stem assemblies. The lower disk connector has a second outer radial surface defined by the outer diameter to slidably engage the inner bonnet surface.

Embodiment 2

The cryogenic valve of embodiment 1, wherein, to deter misalignment, the upper disk connector of each of the one or more modular stem assemblies is configured to slidably engage the inner bonnet surface and securely engage the upper stem assembly or the lower disk connector of an adjacent one of the one or more modular stem assemblies and the lower disk connector of each of the one or more modular stem assemblies is configured to slidably engage the inner bonnet surface and securely engage the lower stem assembly or the upper disk connector of an adjacent one of the one or more modular stem assemblies.

Embodiment 3

The cryogenic valve of embodiment 1 or 2, wherein the modular head of all of the one or more modular stem assemblies are identical.

Embodiment 4

The cryogenic valve of any of embodiments 1-3, wherein the first head of the upper stem assembly is identical to the modular head of each of the one or more modular stem assemblies.

Embodiment 5

The cryogenic valve of any of embodiments 1-4, wherein the modular slot of all of the one or more modular stem assemblies are identical.

Embodiment 6

The cryogenic valve of any of embodiments 1-5, wherein the first slot of the lower stem assembly is identical to the modular slot of each of the one or more modular stem assemblies.

Embodiment 7

The cryogenic valve of any of embodiments 1-6, wherein the one or more modular stem assemblies include a first modular stem assembly having a first length and a second modular stem assembly having a second length. The second length is different than the first length.

Embodiment 8

The cryogenic valve of any of embodiments 1-7, wherein at least one of the one or more modular stem assemblies includes one or more buffers positioned circumferentially about the stem and axially between the upper disk connector and the lower disk connector.

Embodiment 9

The cryogenic valve of embodiment 8, wherein the one or more buffers have outer surfaces defined by the outer diameter to slidably engage the inner bonnet surface.

Embodiment 10

The cryogenic valve of any of embodiments 1-9, wherein the first head of the upper stem assembly and the modular head of each of the one or more modular stem assemblies has a first T-shaped cross-section for securely connecting to an adjacent one of the plurality of stem assemblies.

Embodiment 11

The cryogenic valve of any of embodiments 1-10, wherein the first slot of the lower stem assembly and the modular slot of each of the one or more modular stem assemblies has a second T-shaped cross-section for securely connecting to an adjacent one of the plurality of stem assemblies.

Embodiment 12

A cryogenic valve includes a valve body and a bonnet coupled to the valve body and including an inner bonnet surface. The cryogenic valve includes a plug, a handle, and a plurality of stem assemblies extending between and operatively connecting the handle and the plug. The plurality of stem assemblies include an upper stem assembly operatively connected to the handle and including a first slot, a lower stem assembly connected to the plug and including a first head, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular head for securely coupling to another of the plurality of stem assemblies. The upper disk connector has a first outer radial surface defined by an outer diameter to slidably engage the inner bonnet surface. Each of the one or more modular stem assemblies includes a lower disk connector coupled to the lower end of the stem. The lower disk connector includes a modular slot for securely coupling to another of the plurality of stem assemblies. The lower disk connector has a second outer radial surface defined by the outer diameter to slidably engage the inner bonnet surface.

Embodiment 13

The cryogenic valve of embodiment 12, wherein to deter misalignment, the upper disk connector of each of the one or more modular stem assemblies is configured to slidably engage the inner bonnet surface and securely engage the upper stem assembly or the lower disk connector of an adjacent one of the one or more modular stem assemblies and the lower disk connector of each of the one or more modular stem assemblies is configured to slidably engage the inner bonnet surface and securely engage the lower stem assembly or the upper disk connector of an adjacent one of the one or more modular stem assemblies.

Embodiment 14

The cryogenic valve of embodiment 12 or 13, wherein the modular slot of all of the one or more modular stem assemblies are identical.

Embodiment 15

The cryogenic valve of any of embodiments 12-14, wherein the first slot of the upper stem assembly is identical to the modular slot of each of the one or more modular stem assemblies.

Embodiment 16

The cryogenic valve of any of embodiments 12-15, wherein the modular head of all of the one or more modular stem assemblies are identical.

Embodiment 17

The cryogenic valve of any of embodiments 12-16, wherein the first head of the lower stem assembly is identical to the modular head of each of the one or more modular stem assemblies.

Embodiment 18

The cryogenic valve of any of embodiments 12-17, wherein the one or more modular stem assemblies include a first modular stem assembly having a first length and a second modular stem assembly having a second length. The second length is different than the first length.

Embodiment 19

The cryogenic valve of any of embodiments 12-18, wherein at least one of the one or more modular stem assemblies includes one or more buffers positioned circumferentially about the stem and axially between the upper disk connector and the lower disk connector.

Embodiment 20

The cryogenic valve of embodiment 19, wherein the one or more buffers have outer surfaces defined by the outer diameter to slidably engage the inner bonnet surface.

Embodiment 21

The cryogenic valve of any of embodiments 12-20, wherein the modular head of each of the one or more modular stem assemblies has a first T-shaped cross-section for securely connecting to an adjacent one of the plurality of stem assemblies.

Embodiment 22

The cryogenic valve of any of embodiments 12-21, wherein the modular slot of each of the one or more modular stem assemblies has a second T-shaped cross-section for securely connecting to an adjacent one of the plurality of stem assemblies.

Embodiment 23

A modular stem assembly for a cryogenic valve includes a stem including a first end and a second end. The modular stem assembly includes a first disk connector coupled to the first end of the stem. The first disk connector defines a slot configured to securely receive a stem head of a second stem assembly of the cryogenic valve. The first disk connector has first outer radial surface defined by an outer diameter to slidably engage an inner surface of a bonnet of the cryogenic valve. The modular stem assembly includes a second disk connector coupled to the second end of the stem. The second disk connector includes a head configured to be securely received by a stem slot of a third stem assembly of the cryogenic valve. The second disk connector has a second outer radial surface defined by the outer diameter to slidably engage the inner surface of the bonnet.

Embodiment 24

The modular stem assembly of embodiment 23, wherein the head has a first T-shaped cross-section to securely connect to the third stem assembly.

Embodiment 25

The modular stem assembly of embodiment 23 or 24, wherein the slot has a second T-shaped cross-section to securely connect to the second stem assembly.

Embodiment 26

The modular stem assembly of any of embodiments 23-25, further including a first seal that is positioned circumferentially around the first outer radial surface of the first disk connector and is configured to sealingly engage the inner surface of the bonnet and further including a second seal that is positioned circumferentially around the second outer radial surface of the second disk connector and is configured to sealingly engage the inner surface of the bonnet.

Embodiment 27

The modular stem assembly of any of embodiments 23-26, further including one or more buffers positioned circumferentially about the stem and axially between the first disk connector and the second disk connector.

Embodiment 28

The modular stem assembly of embodiment 27, wherein the one or more buffers includes a plurality of buffers that are stacked axially between the first disk connector and the second disk connector.

Embodiment 29

The modular stem assembly of embodiment 27 or 28, wherein each of the one or more buffers has an outer surface defined by the outer diameter to slidably engage the inner surface of the bonnet.

Embodiment 30

A plurality of stem assemblies stacked axially between and operatively connecting a handle and a plug of a cryogenic valve. The plurality of stem assemblies include an upper stem assembly operatively connected to the handle and including a first head, a lower stem assembly connected to the plug and including a first slot, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular slot for securely coupling to another of the plurality of stem assemblies. The upper disk connector has a first outer radial surface defined by an outer diameter. Each of the one or more modular stem assemblies includes a lower disk connector coupled to the lower end of the stem. The lower disk connector includes a modular head for securely coupling to another of the plurality of stem assemblies. The lower disk connector has a second outer radial surface defined by the outer diameter.

Embodiment 31

The plurality of stem assembles of embodiment 30, wherein, to deter misalignment, the upper disk connector of each of the one or more modular stem assemblies is configured to securely engage the upper stem assembly or the lower disk connector of an adjacent one of the one or more modular stem assemblies and the lower disk connector of each of the one or more modular stem assemblies is configured to securely engage the lower stem assembly or the upper disk connector of an adjacent one of the one or more modular stem assemblies.

Embodiment 32

The plurality of stem assembles of embodiment 30 or 31, wherein the modular head of all of the one or more modular stem assemblies are identical.

Embodiment 33

The plurality of stem assembles of any of embodiments 30-32, wherein the first head of the upper stem assembly is identical to the modular head of each of the one or more modular stem assemblies.

Embodiment 34

The plurality of stem assembles of any of embodiments 30-33, wherein the modular slot of all of the one or more modular stem assemblies are identical.

Embodiment 35

The plurality of stem assembles of any of embodiments 30-34, wherein the first slot of the lower stem assembly is identical to the modular slot of each of the one or more modular stem assemblies.

Embodiment 36

The plurality of stem assembles of any of embodiments 30-35, wherein the one or more modular stem assemblies include a first modular stem assembly having a first length and a second modular stem assembly having a second length. The second length is different than the first length.

Embodiment 37

The plurality of stem assembles of any of embodiments 30-36, wherein at least one of the one or more modular stem assemblies includes one or more buffers positioned circumferentially about the stem and axially between the upper disk connector and the lower disk connector.

Embodiment 38

The plurality of stem assembles of embodiment 37, wherein the one or more buffers have outer surfaces defined by the outer diameter.

Embodiment 39

The plurality of stem assembles of any of embodiments 30-38, wherein the modular head of each of the one or more modular stem assemblies has a first T-shaped cross-section for securely connecting to an adjacent one of the plurality of stem assemblies.

Embodiment 40

The plurality of stem assembles of any of embodiments 30-39, wherein the modular slot of each of the one or more modular stem assemblies has a second T-shaped cross-section for securely connecting to an adjacent one of the plurality of stem assemblies.

Embodiment 41

A plurality of stem assemblies stacked axially between and operatively connecting a handle and a plug of a cryogenic valve. The plurality of stem assemblies include an upper stem assembly operatively connected to the handle and including a first slot, a lower stem assembly connected to the plug and including a first head, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular head for securely coupling to another of the plurality of stem assemblies. The upper disk connector has a first outer radial surface defined by an outer diameter. Each of the one or more modular stem assemblies includes a lower disk connector coupled to the lower end of the stem. The lower disk connector includes a modular slot for securely coupling to another of the plurality of stem assemblies. The lower disk connector has a second outer radial surface defined by the outer diameter.

Embodiment 42

The cryogenic valve of embodiment 41, wherein, to deter misalignment, the upper disk connector of each of the one or more modular stem assemblies is configured to securely engage the upper stem assembly or the lower disk connector of an adjacent one of the one or more modular stem assemblies and the lower disk connector of each of the one or more modular stem assemblies is configured to securely engage the lower stem assembly or the upper disk connector of an adjacent one of the one or more modular stem assemblies.

Embodiment 43

The cryogenic valve of embodiment 41 or 42, wherein the modular slot of all of the one or more modular stem assemblies are identical.

Embodiment 44

The cryogenic valve of any of embodiments 41-43, wherein the first slot of the upper stem assembly is identical to the modular slot of each of the one or more modular stem assemblies.

Embodiment 45

The cryogenic valve of any of embodiments 41-44, wherein the modular head of all of the one or more modular stem assemblies are identical.

Embodiment 46

The cryogenic valve of any of embodiments 41-45, wherein the first head of the lower stem assembly is identical to the modular head of each of the one or more modular stem assemblies.

Embodiment 47

The cryogenic valve of any of embodiments 41-46, wherein the one or more modular stem assemblies include a first modular stem assembly having a first length and a second modular stem assembly having a second length. The second length is different than the first length.

Embodiment 48

The cryogenic valve of any of embodiments 41-47, wherein at least one of the one or more modular stem assemblies includes one or more buffers positioned circumferentially about the stem and axially between the upper disk connector and the lower disk connector.

Embodiment 49

The cryogenic valve of embodiment 48, wherein the one or more buffers have outer surfaces defined by the outer diameter.

Embodiment 50

The cryogenic valve of any of embodiments 41-49, wherein the modular head of each of the one or more modular stem assemblies has a first T-shaped cross-section for securely connecting to an adjacent one of the plurality of stem assemblies.

Embodiment 51

The cryogenic valve of any of embodiments 41-50, wherein the modular slot of each of the one or more modular stem assemblies has a second T-shaped cross-section for securely connecting to an adjacent one of the plurality of stem assemblies.

Embodiment 52

A cryogenic valve includes a valve body, a bonnet coupled to the valve body and including an inner bonnet surface, a plug, a handle, and a plurality of stem assemblies stacked axially between and operatively connecting the handle and the plug. The plurality of stem assemblies include an upper stem assembly operatively connected to the handle and including a first downward-facing connector, a lower stem assembly connected to the plug and including a first upward-facing connector, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular upward-facing connector for securely coupling to another of the plurality of stem assemblies. The upper disk connector has a first outer radial surface defined by an outer diameter to slidably engage the inner bonnet surface. Each of the one or more modular stem assemblies includes a lower disk connector coupled to the lower end of the stem. The lower disk connector includes a modular downward-facing connector for securely coupling to another of the plurality of stem assemblies. The lower disk connector has a second outer radial surface defined by the outer diameter to slidably engage the inner bonnet surface.

Embodiment 53

The cryogenic valve of embodiment 52, wherein, to deter misalignment, the upper disk connector of each of the one or more modular stem assemblies is configured to slidably engage the inner bonnet surface and securely engage the upper stem assembly or the lower disk connector of an adjacent one of the one or more modular stem assemblies and the lower disk connector of each of the one or more modular stem assemblies is configured to slidably engage the inner bonnet surface and securely engage the lower stem assembly or the upper disk connector of an adjacent one of the one or more modular stem assemblies.

Embodiment 54

The cryogenic valve of embodiment 52 or 53, wherein the modular downward-facing connector of all of the one or more modular stem assemblies are identical.

Embodiment 55

The cryogenic valve of any of embodiments 52-54, wherein the first downward-facing connector of the upper stem assembly is identical to the modular downward-facing connector of each of the one or more modular stem assemblies.

Embodiment 56

The cryogenic valve of any of embodiments 52-55, wherein the modular upward-facing connector of all of the one or more modular stem assemblies are identical.

Embodiment 57

The cryogenic valve of any of embodiments 52-56, wherein the first upward-facing connector of the lower stem assembly is identical to the modular upward-facing connector of each of the one or more modular stem assemblies.

Embodiment 58

The cryogenic valve of any of embodiments 52-57, wherein the one or more modular stem assemblies include a first modular stem assembly having a first length and a second modular stem assembly having a second length. The second length is different than the first length.

Embodiment 59

The cryogenic valve of any of embodiments 52-58, wherein at least one of the one or more modular stem assemblies includes one or more buffers positioned circumferentially about the stem and axially between the upper disk connector and the lower disk connector.

Embodiment 60

The cryogenic valve of embodiment 59, wherein the one or more buffers have outer surfaces defined by the outer diameter to slidably engage the inner bonnet surface.

Embodiment 61

The cryogenic valve of any of embodiments 52-60, wherein the first downward-facing connector of the upper stem assembly and the modular downward-facing connector of each of the one or more modular stem assemblies has a first T-shaped cross-section for securely connecting to an adjacent one of the plurality of stem assemblies.

Embodiment 62

The cryogenic valve of any of embodiments 52-61, wherein the first upward-facing connector of the lower stem assembly and the modular upward-facing connector of each of the one or more modular stem assemblies has a second T-shaped cross-section for securely connecting to an adjacent one of the plurality of stem assemblies.

Embodiment 63

The cryogenic valve of any of embodiments 52-62, wherein each of the first downward-facing connector of the upper stem assembly and the modular downward-facing connector of each of the one or more modular stem assemblies is a head and each of the first upward-facing connector of the lower stem assembly and the modular upward-facing connector of each of the one or more modular stem assemblies is a slot.

Embodiment 64

The cryogenic valve of any of embodiments 52-62, wherein each of the first downward-facing connector of the upper stem assembly and the modular downward-facing connector of each of the one or more modular stem assemblies is a slot and each of the first upward-facing connector of the lower stem assembly and the modular upward-facing connector of each of the one or more modular stem assemblies is a head.

Embodiment 65

A plurality of stem assemblies stacked axially between and operatively connecting a handle and a plug of a cryogenic valve. The plurality of stem assemblies include an upper stem assembly operatively connected to the handle and including a first downward-facing connector, a lower stem assembly connected to the plug and including a first upward-facing connector, and one or more modular stem assemblies extending between the upper and lower stem assemblies. Each of the one or more modular stem assemblies includes a stem including an upper end and a lower end and an upper disk connector coupled to the upper end of the stem. The upper disk connector defines a modular upward-facing connector for securely coupling to another of the plurality of stem assemblies. The upper disk connector has a first outer radial surface defined by an outer diameter. Each of the one or more modular stem assemblies includes a lower disk connector coupled to the lower end of the stem. The lower disk connector includes a modular downward-facing connector for securely coupling to another of the plurality of stem assemblies. The lower disk connector has a second outer radial surface defined by the outer diameter.

Embodiment 66

The plurality of stem assembles of embodiment 65, wherein, to deter misalignment, the upper disk connector of each of the one or more modular stem assemblies is configured to securely engage the upper stem assembly or the lower disk connector of an adjacent one of the one or more modular stem assemblies and the lower disk connector of each of the one or more modular stem assemblies is configured to securely engage the lower stem assembly or the upper disk connector of an adjacent one of the one or more modular stem assemblies.

Embodiment 67

The plurality of stem assembles of embodiment 65 or 66, wherein the modular downward-facing connector of all of the one or more modular stem assemblies are identical.

Embodiment 68

The plurality of stem assembles of any of embodiments 65-67, wherein the first downward-facing connector of the upper stem assembly is identical to the modular downward-facing connector of each of the one or more modular stem assemblies.

Embodiment 69

The plurality of stem assembles of any of embodiments 65-68, wherein the modular upward-facing connector of all of the one or more modular stem assemblies are identical.

Embodiment 70

The plurality of stem assembles of any of embodiments 65-69, wherein the first upward-facing connector of the lower stem assembly is identical to the modular upward-facing connector of each of the one or more modular stem assemblies.

Embodiment 71

The plurality of stem assembles of any of embodiments 65-70, wherein the one or more modular stem assemblies include a first modular stem assembly having a first length and a second modular stem assembly having a second length. The second length is different than the first length.

Embodiment 72

The plurality of stem assembles of any of embodiments 65-71, wherein at least one of the one or more modular stem assemblies includes one or more buffers positioned circumferentially about the stem and axially between the upper disk connector and the lower disk connector.

Embodiment 73

The plurality of stem assembles of embodiment 72, wherein the one or more buffers have outer surfaces defined by the outer diameter.

Embodiment 74

The plurality of stem assembles of any of embodiments 65-73, wherein the modular downward-facing connector of each of the one or more modular stem assemblies has a first T-shaped cross-section for securely connecting to an adjacent one of the plurality of stem assemblies.

Embodiment 75

The plurality of stem assembles of any of embodiments 65-74, wherein the modular upward-facing connector of each of the one or more modular stem assemblies has a second T-shaped cross-section for securely connecting to an adjacent one of the plurality of stem assemblies.

Embodiment 76

The plurality of stem assembles of any of embodiments 65-75, wherein each of the first downward-facing connector of the upper stem assembly and the modular downward-facing connector of each of the one or more modular stem assemblies is a head and each of the first upward-facing connector of the lower stem assembly and the modular upward-facing connector of each of the one or more modular stem assemblies is a slot.

Embodiment 77

The plurality of stem assembles of any of embodiments 65-75, wherein each of the first downward-facing connector of the upper stem assembly and the modular downward-facing connector of each of the one or more modular stem assemblies is a slot and each of the first upward-facing connector of the lower stem assembly and the modular upward-facing connector of each of the one or more modular stem assemblies is a head.

What is claimed is:

1. A cryogenic valve, comprising:
a valve body;
a bonnet coupled to the valve body and including an inner bonnet surface;
a plug;
a handle;
a plurality of stem assemblies stacked axially between and operatively connecting the handle and the plug, wherein the plurality of stem assemblies include:
an upper stem assembly operatively connected to the handle and including a first downward-facing connector;
a lower stem assembly connected to the plug and including a first upward-facing connector; and
one or more modular stem assemblies extending between the upper and lower stem assemblies, each of the one or more modular stem assemblies includes:
a stem including an upper end and a lower end;
an upper disk connector coupled to the upper end of the stem, wherein the upper disk connector defines a modular upward-facing connector for securely coupling to another of the plurality of stem assemblies, wherein the upper disk connector has a first outer radial surface defined by an outer diameter to slidably engage the inner bonnet surface; and
a lower disk connector coupled to the lower end of the stem, wherein the lower disk connector includes a modular downward-facing connector for securely coupling to another of the plurality of stem assemblies, wherein the lower disk connector has a second outer radial surface defined by the outer diameter to slidably engage the inner bonnet surface,
wherein the first downward-facing connector of the upper stem assembly is identical to the modular downward-facing connector of each of the one or more modular stem assemblies.

2. The cryogenic valve of claim 1, wherein the first downward-facing connector of the upper stem assembly and the modular downward-facing connector of each of the one or more modular stem assemblies has a first-T-shaped cross-section for securely connecting to an adjacent one of the plurality of stem assemblies.

3. The cryogenic valve of claim 1, wherein each of the first downward-facing connector of the upper stem assembly and the modular downward-facing connector of each of the one or more modular stem assemblies is a head.

4. The cryogenic valve of claim 1, wherein:
each of the first downward-facing connector of the upper stem assembly and the modular downward-facing connector of each of the one or more modular stem assemblies is a slot.

5. The cryogenic valve of claim 1, wherein the one or more modular stem assemblies includes a plurality of modular stem assemblies.

6. A cryogenic valve, comprising:
a valve body;
a plug;
a handle;
a plurality of stem assemblies stacked axially between and operatively connecting the handle and the plug, wherein the plurality of stem assemblies include:
an upper stem assembly operatively connected to the handle and including a first downward-facing connector;
a lower stem assembly connected to the plug and including a first upward-facing connector; and
a plurality of modular stem assemblies extending between the upper and lower stem assemblies, each of the plurality of modular stem assemblies includes:
a stem including an upper end and a lower end;
an upper disk connector coupled to the upper end of the stem, wherein the upper disk connector defines a modular upward-facing connector for securely coupling to another of the plurality of stem assemblies; and
a lower disk connector coupled to the lower end of the stem, wherein the lower disk connector includes a modular downward-facing connector for securely coupling to another of the plurality of stem assemblies,
wherein the modular downward-facing connector of all of the plurality of modular stem assemblies are identical.

7. The cryogenic valve of claim 6, wherein the first downward-facing connector of the upper stem assembly and the modular downward-facing connector of each of the plurality of modular stem assemblies has a T-shaped cross-section for securely connecting to an adjacent one of the plurality of stem assemblies.

8. The cryogenic valve of claim 6, wherein each of the first downward-facing connector of the upper stem assembly and the modular downward-facing connector of each of the plurality of modular stem assemblies is a head.

9. The cryogenic valve of claim 6, wherein each of the first downward-facing connector of the upper stem assembly and the modular downward-facing connector of each of the plurality of modular stem assemblies is a slot.

10. The cryogenic valve of claim 6, wherein the plurality of modular stem assemblies include a first modular stem assembly having a first length and a second modular stem assembly having a second length, wherein the second length is different than the first length.

11. A cryogenic valve, comprising:
a valve body;
a plug;
a handle;
a plurality of stem assemblies stacked axially between and operatively connecting the handle and the plug, wherein the plurality of stem assemblies include:
an upper stem assembly operatively connected to the handle and including a first downward-facing connector;
a lower stem assembly connected to the plug and including a first upward-facing connector; and
one or more modular stem assemblies extending between the upper and lower stem assemblies, each of the one or more modular stem assemblies includes:

a stem including an upper end and a lower end;

an upper disk connector coupled to the upper end of the stem, wherein the upper disk connector defines a modular upward-facing connector for securely coupling to another of the plurality of stem assemblies; and a lower disk connector coupled to the lower end of the stem, wherein the lower disk connector includes a modular downward-facing connector for securely coupling to another of the plurality of stem assemblies, wherein the first upward-facing connector of the lower stem assembly is identical to the modular upward-facing connector of each of the one or more modular stem assemblies.

12. The cryogenic valve of claim 11, wherein the first upward-facing connector of the lower stem assembly and the modular upward-facing connector of each of the one or more modular stem assemblies has a T-shaped cross-section for securely connecting to an adjacent one of the plurality of stem assemblies.

13. The cryogenic valve of claim 11, wherein each of the first upward-facing connector of the lower stem assembly and the modular upward-facing connector of each of the one or more modular stem assemblies is a slot.

14. The cryogenic valve of claim 11, wherein each of the first upward-facing connector of the lower stem assembly and the modular upward-facing connector of each of the one or more modular stem assemblies is a head.

15. The cryogenic valve of claim 11, wherein the one or more modular stem assemblies includes a plurality of modular stem assemblies.

16. A cryogenic valve, comprising:

a valve body;

a plug;

a handle;

a plurality of stem assemblies stacked axially between and operatively connecting the handle and the plug, wherein the plurality of stem assemblies include:

an upper stem assembly operatively connected to the handle and including a first downward-facing connector;

a lower stem assembly connected to the plug and including a first upward-facing connector; and a plurality of modular stem assemblies extending between the upper and lower stem assemblies, each of the plurality of modular stem assemblies includes:

a stem including an upper end and a lower end;

an upper disk connector coupled to the upper end of the stem, wherein the upper disk connector defines a modular upward-facing connector for securely coupling to another of the plurality of stem assemblies; and a lower disk connector coupled to the lower end of the stem, wherein the lower disk connector includes a modular downward-facing connector for securely coupling to another of the plurality of stem assemblies, wherein the modular upward-facing connector of all of the plurality of modular stem assemblies are identical.

17. The cryogenic valve of claim 16, wherein the first upward-facing connector of the lower stem assembly and the modular upward-facing connector of each of the plurality of modular stem assemblies has a T-shaped cross-section for securely connecting to an adjacent one of the plurality of stem assemblies.

18. The cryogenic valve of claim 16, wherein each of the first upward-facing connector of the lower stem assembly and the modular upward-facing connector of each of the plurality of modular stem assemblies is a slot.

19. The cryogenic valve of claim 16, wherein each of the first upward-facing connector of the lower stem assembly and the modular upward-facing connector of each of the plurality of modular stem assemblies is a head.

20. The cryogenic valve of claim 16, wherein the plurality of modular stem assemblies include a first modular stem assembly having a first length and a second modular stem assembly having a second length, wherein the second length is different than the first length.

* * * * *